(12) United States Patent
Parrinello et al.

(10) Patent No.: US 9,446,550 B2
(45) Date of Patent: Sep. 20, 2016

(54) APPARATUS AND METHOD FOR PRODUCING PLASTIC CONTAINERS

(71) Applicant: SACMI COOPERATIVA MECCANICI IMOLA SOCIETA' COOPERATIVA, Imola (IT)

(72) Inventors: Fiorenzo Parrinello, Medicina (IT); Zeno Zuffa, Borgo Tossignano (IT); Matteo Camerani, Russi (IT); Ivan Bonzi, Imola (IT); Gabriele Stocchi, Parma (IT)

(73) Assignee: SACMI COOPERATIVA MECCANICI IMOLA SOCIETA' COOPERATIVA, Imola (IT)

(*) Notice: Subject to any disclaimer, the term of this patent is extended or adjusted under 35 U.S.C. 154(b) by 0 days.

(21) Appl. No.: 14/450,807

(22) Filed: Aug. 4, 2014

(65) Prior Publication Data

US 2014/0338291 A1  Nov. 20, 2014

Related U.S. Application Data

(60) Continuation of application No. 13/953,142, filed on Jul. 29, 2013, now Pat. No. 9,028,739, which is a division of application No. 12/988,454, filed as application No. PCT/IB2009/005277 on Apr. 16, 2009, now Pat. No. 8,556,620.

(30) Foreign Application Priority Data

Apr. 18, 2008 (IT) .............................. MO2008A0112
Oct. 23, 2008 (IT) .............................. MO2008A0272

(51) Int. Cl.
*B29C 49/02* (2006.01)
*B29C 49/42* (2006.01)
(Continued)

(52) U.S. Cl.
CPC ............. *B29C 49/061* (2013.01); *B29C 43/08* (2013.01); *B29C 49/06* (2013.01); *B29C 49/28* (2013.01); *B29C 49/4205* (2013.01);
(Continued)

(58) Field of Classification Search
CPC . B29C 49/061; B29C 49/062; B29C 49/063; B29C 49/4205; B29C 2049/028
USPC ..................................................... 198/347.1
See application file for complete search history.

(56) References Cited

U.S. PATENT DOCUMENTS

| 2,931,276 A | 4/1960 | Zerlin |
| 3,738,891 A | 6/1973 | Püsching et al. |

(Continued)

FOREIGN PATENT DOCUMENTS

| DE | 10150780 A1 | 4/2003 |
| EP | 0066119 A1 | 12/1982 |

(Continued)

*Primary Examiner* — Robert B Davis
(74) *Attorney, Agent, or Firm* — Pearne & Gordon LLP

(57) ABSTRACT

An apparatus for producing plastic containers includes: a forming machine for producing plastic preforms; a blow-moulding machine for blowing the preforms to obtain containers, provided with a blow-moulding carousel having a plurality of blow-moulding moulds that expand the preforms to obtain the containers; a thermal conditioning station interposed between the forming machine and the blow-moulding machine; a storage station, configured for receiving and containing preforms; a supplying system for feeding the thermal conditioning station with preforms contained in the storage station.

20 Claims, 28 Drawing Sheets

(51) Int. Cl.
*B29C 49/68* (2006.01)
*B29C 49/06* (2006.01)
*B29C 43/08* (2006.01)
*B29C 49/78* (2006.01)
*B65G 43/08* (2006.01)
*B29D 22/00* (2006.01)
*B29C 49/28* (2006.01)
*B65B 47/08* (2006.01)
*B29B 11/12* (2006.01)
*B29C 49/36* (2006.01)
*B29C 49/64* (2006.01)
*B29C 43/34* (2006.01)
*B29K 23/00* (2006.01)
*B29K 67/00* (2006.01)
*B29L 22/00* (2006.01)
*B29L 31/00* (2006.01)

(52) U.S. Cl.
CPC ............ *B29C 49/78* (2013.01); *B29D 22/003* (2013.01); *B65B 47/08* (2013.01); *B65G 43/08* (2013.01); *B29B 11/12* (2013.01); *B29C 49/36* (2013.01); *B29C 49/6409* (2013.01); *B29C 2043/3466* (2013.01); *B29C 2049/028* (2013.01); *B29K 2023/12* (2013.01); *B29K 2067/00* (2013.01); *B29K 2067/003* (2013.01); *B29L 2022/00* (2013.01); *B29L 2031/712* (2013.01); *B65G 2201/0244* (2013.01); *B65G 2203/025* (2013.01); *B65G 2203/0241* (2013.01); *B65G 2203/042* (2013.01)

(56) References Cited

U.S. PATENT DOCUMENTS

| | | |
|---|---|---|
| 4,147,748 A | 4/1979 | Saumsiegle |
| 4,313,905 A | 2/1982 | Hafele |
| 4,361,759 A | 11/1982 | King et al. |
| 4,456,114 A | 6/1984 | Mohn |
| 4,570,783 A | 2/1986 | Newcom et al. |
| 5,591,462 A | 1/1997 | Darling et al. |
| 5,759,218 A | 6/1998 | Martin et al. |
| 5,772,951 A | 6/1998 | Coxhead et al. |
| 5,996,322 A | 12/1999 | La Barre |
| 2002/0011681 A1 | 1/2002 | Rose et al. |
| 2003/0008029 A1 | 1/2003 | Lanfranchi |
| 2006/0222729 A1 | 10/2006 | Larsen |
| 2007/0220835 A1* | 9/2007 | Till ................................ 53/471 |
| 2007/0224307 A1* | 9/2007 | Zoppas et al. ................ 425/445 |

FOREIGN PATENT DOCUMENTS

| | | |
|---|---|---|
| EP | 0 813 949 A1 | 12/1997 |
| EP | 0 856 392 A2 | 8/1998 |
| EP | 1538116 A1 | 6/2005 |
| EP | 1679178 A1 | 7/2006 |
| GB | 1530305 A | 10/1978 |
| IT | 1359024 A | 3/2007 |
| JP | H08142169 A | 6/1996 |
| JP | 2003039532 A | 2/2003 |
| WO | 2006092652 A1 | 9/2006 |

* cited by examiner

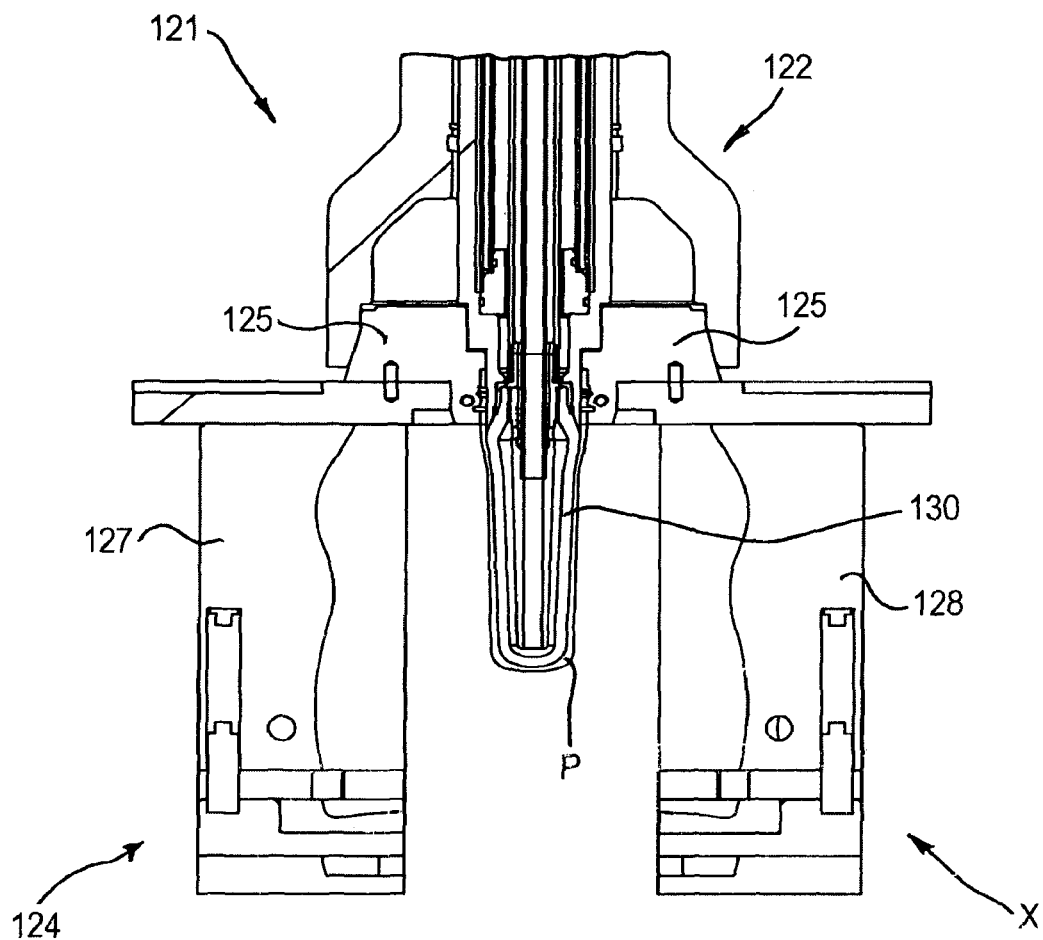
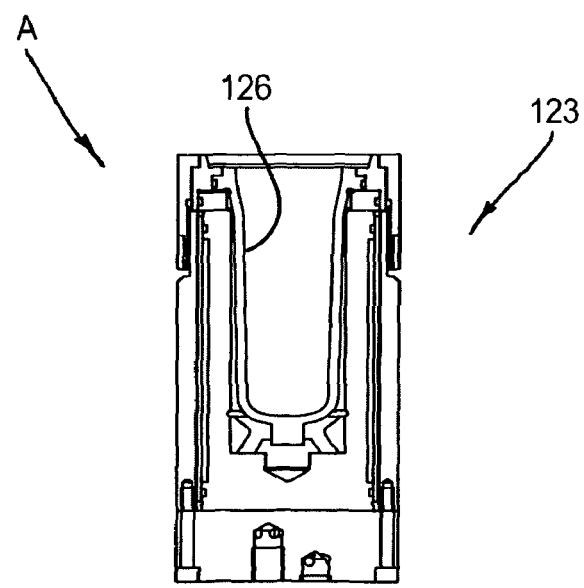
Fig. 9

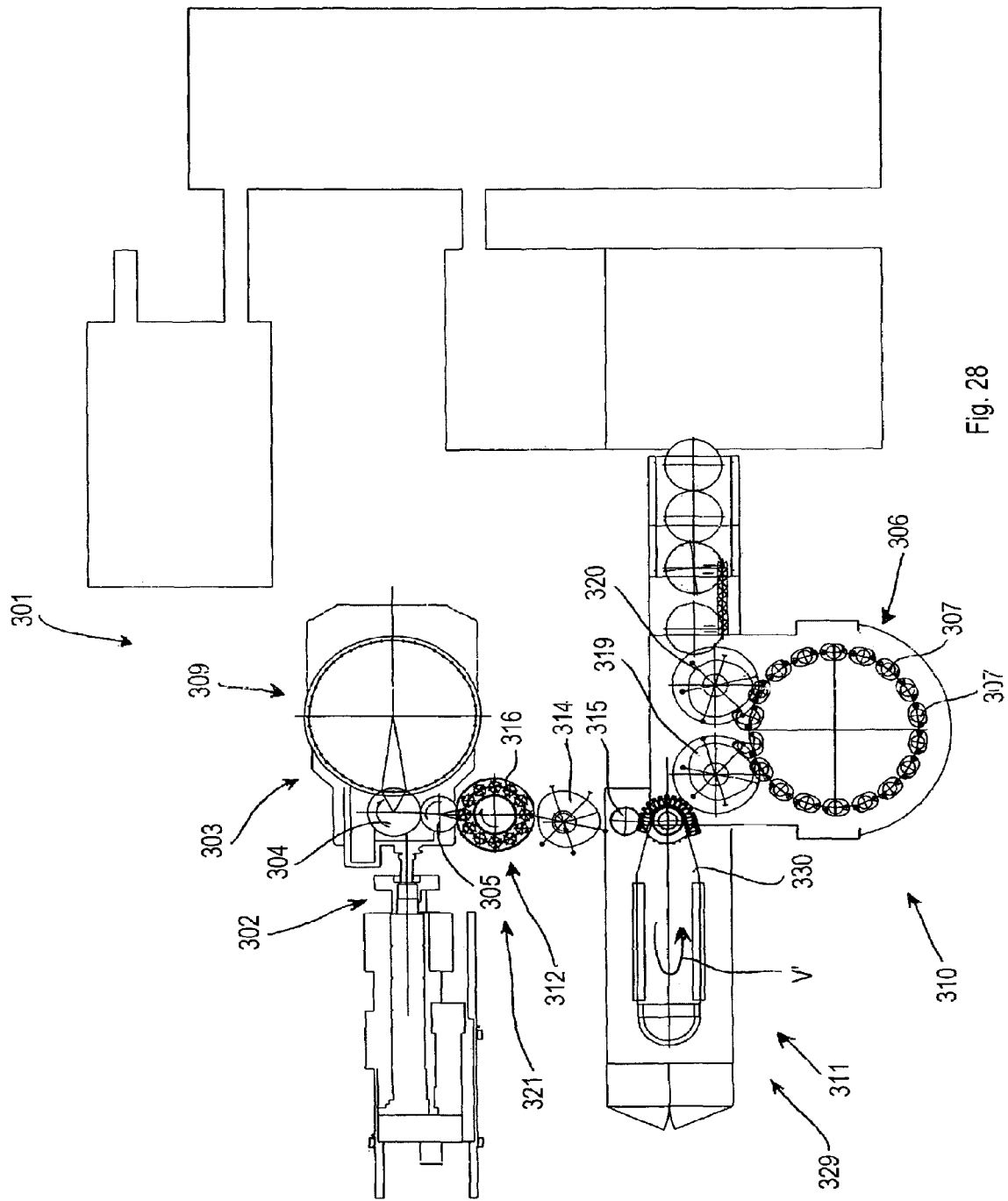

APPARATUS AND METHOD FOR PRODUCING PLASTIC CONTAINERS

FIELD OF THE INVENTION

The invention relates to a method and apparatuses for forming plastics for producing preforms that are subsequently expanded to obtain containers intended to be filled with a product.

BACKGROUND OF THE INVENTION

Moulding machines are known that are arranged for forming plastics to obtain preforms. Such machines can be compression-moulding machines, or injection-moulding machines.

Blowing machines are further known that are supplied with preforms and blow the preforms to obtain containers.

Filling machines are also known that fill containers with a product.

An apparatus is further known comprising a moulding machine for compression-moulding plastics to obtain preforms, a thermal conditioning station for the preforms, arranged downstream of the moulding machine, and a blowing machine arranged downstream of the thermal conditioning station and suitable for blowing the preforms so as to obtain containers therefrom.

The preforms are first compression-moulded, and subsequently removed from the moulding machine to be transferred to the thermal conditioning station, where they are heated to a temperature that is suitable for the blow-moulding step. During the advancing from the moulding machine to the thermal conditioning station, the preforms are arranged sequentially one after the other and move along a preset advance path.

The preforms, after being compression-moulded and before they advance to the thermal conditioning station, require a cooling step that is suitable for stabilising the shape thereof and for avoiding crystallisation phenomena that compromise the transparency of a bottle that is subsequently obtained from the preform and alter the mechanical features thereof.

The duration of the cooling step depends on the type and/or on the geometry of the preforms. Thus, a given period of time required for the cooling step corresponds to a given geometry and/or type of preform. For given types or geometries of preforms it is necessary to slow the moulding machine so as to support the preforms for longer, thus enabling suitable cooling. This entails an undesired reduction in productivity in all those cases in which it is not possible to modify cooling efficacy.

The preforms, before being positioned on the blowing machine, have to be suitably heated, and for this purpose remain in the thermal conditioning station for a further set period of time that is a function of the geometry and/or of the type of preforms thereof.

A drawback of the aforesaid apparatus is that it has productivity that is limited by the time required for the preforms to be thermally conditioned. In particular, the productivity depends on the period of time that the preforms, arranged in sequence one after another along the advance path, require for the cooling step that is subsequent to compression-moulding.

In other words, the operation of the moulding machine located upstream and of the blowing machine located downstream depends on, and is constrained by, the period of time required for cooling the preforms that have just been moulded, this period of time depending on the type/geometry of the preform.

SUMMARY OF THE INVENTION

An object of the invention is to obtain an apparatus provided with a machine for producing preforms and with a machine for blowing such preforms to obtain containers that are operationally connected together in a flexible manner.

A further object of the invention is to obtain a method that enables a product to be packaged inside a container in a hygienic manner.

Another object is to obtain an apparatus for producing containers and for packaging a product in such containers immediately after such containers have been produced, in which the containers have not been damaged between the producing step and the filling step.

Another object is to obtain an apparatus for producing containers and for packaging a product in such containers that is provided with great efficiency.

A still further object is to obtain an apparatus for producing containers and for filling such containers with a product that is very compact.

In a first aspect of the invention, an apparatus is provided comprising a first operating machine arranged for processing objects, a second operating machine positioned downstream of said first operating machine and arranged for further processing said objects, an accumulating arrangement interposed between said first operating machine and said second operating machine and arranged for receiving said objects and a command and control arrangement arranged for detecting a parameter indicating the quantity of said objects contained in said accumulating arrangement and regulating the operation of said second operating machine on the basis of said parameter.

In one embodiment, the first operating machine is a compression-moulding machine arranged for forming plastics to obtain preforms and the second operating machine is a blow-moulding machine arranged for blowing the preforms to obtain containers.

Owing to this aspect of the invention, it is possible to obtain a very flexible apparatus. The compression-moulding machine and the blow-moulding machine have distinct driving devices. The speed of the blow-moulding machine is, within a certain limit, independent of the speed of the compression-moulding machine and can be varied according to the number of preforms contained inside the accumulating arrangement. Further, stopping the compression-moulding machine does not necessary entail stopping the blow-moulding machine, and vice versa.

In a second aspect of the invention an apparatus is provided comprising a compression-moulding machine, suitable for compression-moulding plastics to obtain preforms, a blow-moulding machine, suitable for blowing said preforms to obtain containers, a thermal conditioning station for said preforms, interposed between said compression-moulding machine and said blow-moulding machine, a moving arrangement for moving said preforms to an intermediate zone between said compression-moulding machine and said thermal conditioning station, wherein said moving arrangement is configured so as to advance said preforms along advance paths of variable length to vary the dwelling time of said preforms in said intermediate zone.

In a third aspect of the invention there is provided a method comprising compression-moulding plastics to obtain preforms in a first operating zone, blow-moulding said preforms to obtain containers in a second operating zone, thermally conditioning said preforms in a third operating zone interposed between said first zone and said second zone, moving said preforms to an intermediate zone interposed between said first operating zone to said second operating zone, wherein said moving comprises advancing said preforms along advance paths of variable length to vary the dwelling time of said preforms in said intermediate zone.

Owing to these aspects of the invention, it is possible to produce containers with high levels of efficiency and productivity.

In a fourth aspect of the invention a method is provided, comprising dispensing plastics in pasty state, during said dispensing said plastics having a dispensing temperature, compression-moulding said plastics to obtain a preform, blowing said preform to obtain a container, during said blowing said plastics having a blowing temperature, filling said container with a product, during said filling said plastics having a filling temperature, in which said dispensing temperature is greater than said blowing temperature and said blowing temperature is greater than said filling temperature.

Owing to this aspect of the invention, it is possible to package a product in a hygienically controlled manner. The dispensing temperature (i.e. the temperature of the plastics exiting a plasticising device, for example an extruder), is in fact greater than the temperature at which the destruction of possible microorganisms, in particular viruses and/or bacteria, is assured.

As a preform is obtained from the plastics at high temperature that is expanded within a short space of time to obtain a container that, in turn, is filled within a short space of time, all possibility of pollution is substantially eliminated.

In addition, the filling temperature is less than the blowing temperature by an amount that is such as to enable the shape of the container to be stabilised and not to be deformed during filling, in particular owing to the interaction with the product that has to be packaged.

The product, in particular if it comprises a fluid material, can contribute to cooling the plastics. This enables the container-manufacturing cycle to be shortened and simplified.

In one embodiment, after the compression-moulding step and before the blow-moulding step, the preform is cooled to a thermal treatment temperature that is less than the blowing temperature and the preform is subsequently heated to the blowing temperature.

After the plastics have been subjected to compression-moulding, the plastics have a higher temperature at an internal zone of the walls that bound the body of the preform and a lower temperature at external zones of the walls that bound the body of the preform. This is because the external zones of the walls that bound the body of the preform have interacted with a forming mould in which a cooling arrangement is provided, for example, with conduits through which a cooling fluid circulates. In addition, the external zones of the walls that bound the body of the preform, after extraction of the preform from the forming mould, have been cooled by the air in the environment. The heating of the preforms from the thermal treatment temperature to the blowing temperature is obtained by giving heat to the preforms by means of a heating device positioned outside the latter. Consequently, the external zones of the walls that bound the body of the preform receive a quantity of heat that is greater than the quantity of heat received from the internal zone of the walls that bound the body of the preform. In this manner, the difference in temperature between the internal zones of the walls that bound the body of the preform and the external zone of the walls that bound the body of the preform is noticeably reduced, or is even substantially eliminated. This enables the subsequent step of blowing the preform to be improved, which is optimal if the temperature of the walls that bound the body of the preform is substantially uniform along the thickness of the walls thereof.

In a fifth aspect of the invention, an apparatus is provided, comprising a compression-moulding machine arranged for compression-moulding plastics to obtain preforms, a blow-moulding machine arranged for blowing said preforms to obtain containers, a moving arrangement arranged for removing said preforms from said compression-moulding machine and delivering said preforms to said blow-moulding machine, a filling machine arranged for filling said containers with a product and a transferring device arranged for transferring said containers from said blow-moulding machine to said filling machine, maintaining said containers spaced apart from one another.

Owing to this aspect of the invention, it is possible to obtain an apparatus in which the containers are not damaged during transfer from the blow-moulding machine to the filling machine. The containers, which owing to the high temperature of some parts thereof are rather delicate, could be deformed and/or damaged so as to have aesthetic defects if they were placed in mutual contact immediately after being removed from the blow-moulding machine. This does not occur in the apparatus according to the invention as the transferring device prevents the containers from interacting with one another.

In an embodiment, the transferring device maintains the containers at a set distance from one another. In other words, the transferring device removes the containers from the blow-moulding machine according to a preset removal step and delivers the containers to the filling machine according to a preset delivery step (the removal step and the delivery step being able to be the same as or different from one another).

The blow-moulding machine and the filling machine can thus operate synchronously, which enables a very efficient apparatus to be obtained.

In a sixth aspect of the invention, an apparatus is provided comprising a moulding machine provided with a movable supporting device that supports a mould arrangement comprising a compression-moulding arrangement arranged for compression-moulding plastics to obtain preforms and a blow-moulding arrangement arranged for blowing said preforms to obtain containers, said apparatus further comprising a filling machine arranged for filling said containers with a product and a moving arrangement arranged for removing said containers from said moulding machine and delivering said containers to said filling machine.

Owing to this aspect of the invention, it is possible to obtain a very compact apparatus for packaging a product. In fact, the preforms are formed and blown on the same moulding machine and the containers obtained by blowing the preforms are immediately filled in a filling machine positioned downstream of the moulding machine.

In an embodiment, the compression-moulding arrangement comprises a compression-moulding die cooperating with a punch for compression-moulding the plastics and the blow-moulding arrangement comprises a blow-moulding die cooperating with the aforesaid punch to blow the preforms to obtain the containers. In other words, the compression-moulding die and the blow-moulding die interact with the punch the one after another. Initially, the compression-moulding die and the punch interact to form a preform.

Subsequently, the compression-moulding die moves away from the punch and the preform is maintained on the punch. Still subsequently, the blow-moulding die moves towards the punch and interacts with the punch to define a forming chamber inside which the preform is expanded.

In one embodiment, the mould arrangement comprises a plurality of moulds supported by the movable supporting device.

BRIEF DESCRIPTION OF THE DRAWINGS

The invention can be better understood and implemented with reference to the attached drawings, which illustrate some embodiments thereof by way of non-limiting example, in which:

FIGS. 7 to 10 are sections taken along a longitudinal plane of the mould in FIG. 6 that show subsequent steps of a work cycle of the mould;

FIG. 28 is a schematic layout of a still further embodiment of the apparatus for producing containers.

DESCRIPTION OF THE PREFERRED EMBODIMENTS

Figure 1:
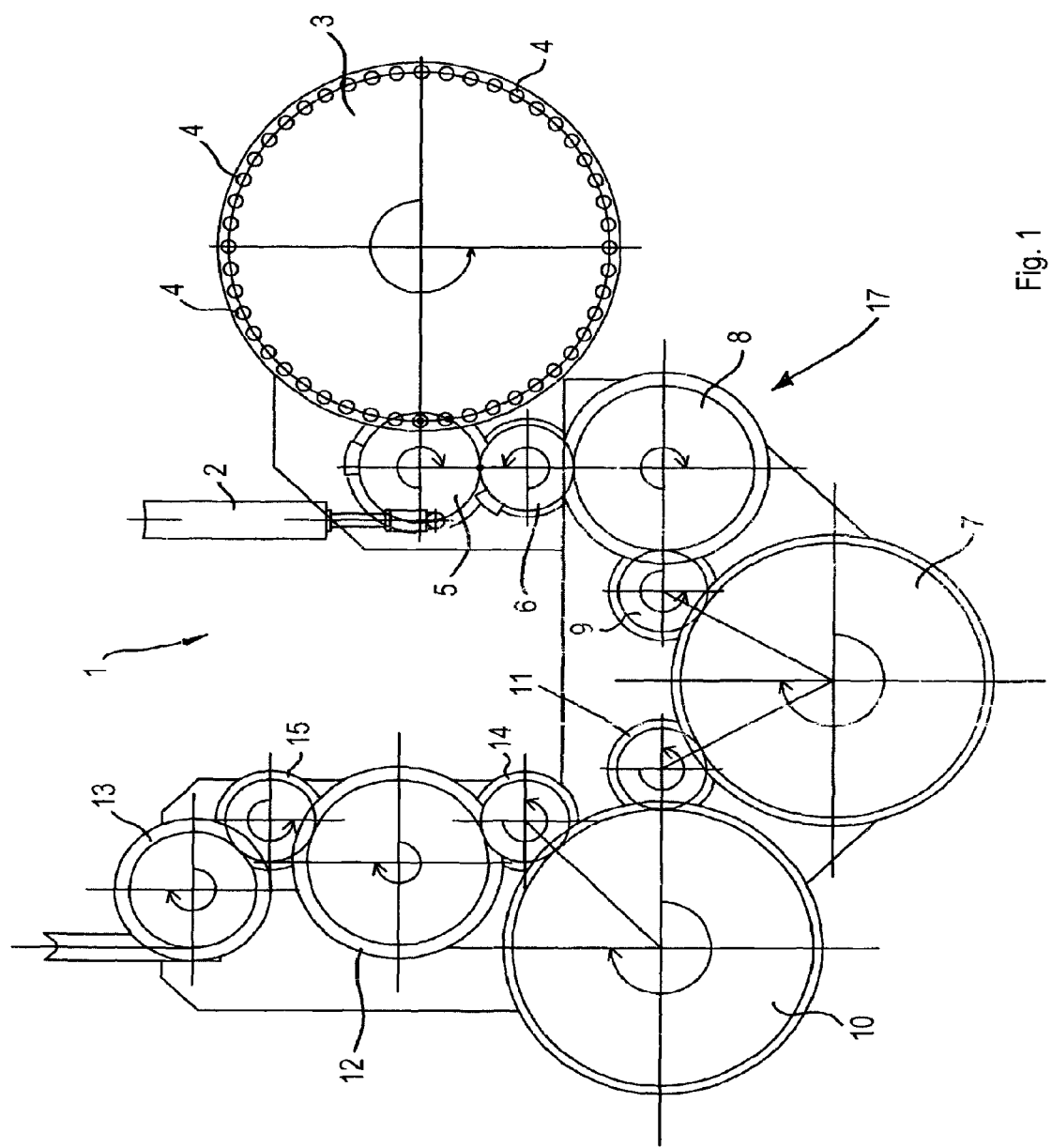
FIG. 1 is a schematic layout of an apparatus for forming preforms made of plastics, expanding the preforms to obtain containers and filling the containers with a product.
Figure 2:
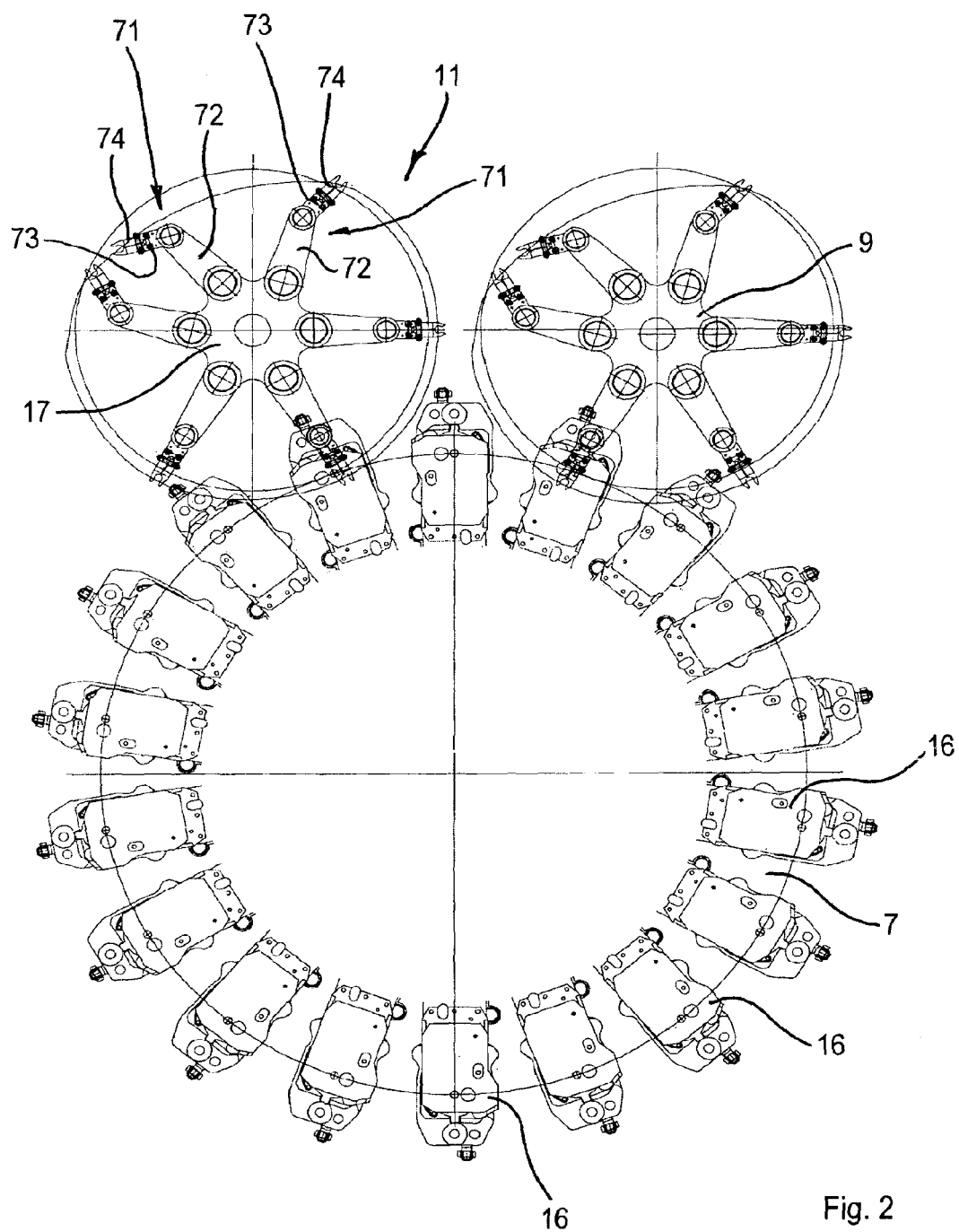
FIG. 2 is a detail of FIG. 1.

With reference to FIGS. 1 and 2, there is shown an apparatus 1 comprising a plasticising device, for example an extruder 2, arranged for dispensing plastics in a pasty state. With the extruder 2 a cutting device is associated, which is not shown, that divides the plastics into doses.

The apparatus 1 further comprises a compression-moulding carousel 3 provided with a plurality of compression-moulding moulds 4—for example positioned at constant angular intervals on a peripheral zone of the compression-moulding carousel 3—that compression-mould the doses to obtain preforms. Each compression-moulding mould 4 comprises a female half mould and a male half mould that are movable towards and away from one another, the female half mould being provided with a cavity arranged for receiving a dose and the male half mould being provided with a punch arranged for penetrating inside the cavity to shape the dose.

The apparatus 1 further comprises a moving carousel 5 interposed between the extruder 2 and the compression-moulding carousel 3. The moving carousel 5 removes the doses from the extruder 2 and inserts the doses into the compression-moulding moulds 4. The moving carousel 5 further removes the preforms from the compression-moulding moulds 4 and delivers the preforms to a first transfer carousel 6.

The apparatus 1 further comprises a blow-moulding carousel 7 provided with a plurality of blow-moulding moulds 16—for example positioned at constant angular intervals on a peripheral zone of the blow-moulding carousel 7—that expand the preforms to obtain containers.

Between the compression-moulding carousel 3 and the blow-moulding carousel 7 a thermal conditioning device 17 can be interposed arranged for thermally conditioning the preforms to prepare the preforms for blowing.

The thermal conditioning device 17 may comprise a thermal conditioning carousel 8 and/or one or more thermal conditioning tunnels.

The preforms are introduced into the thermal conditioning device 17 by the first transfer carousel 6 and are removed from the thermal conditioning device by a second transfer carousel 9.

The apparatus 1 further comprises a filling carousel 10 on which a filling device is provided that fills the containers with a product, this product being able to comprise a liquid material, a powder or granule material, a paste material and the like. The aforesaid product can be, for example, a food product or a cosmetic product.

The apparatus 1 further comprises a transferring device 11 that removes the containers from the blow-moulding carousel 7 and delivers the containers to the filling carousel 10.

The transferring device 11 comprises a rotating body 70 that supports a plurality of handling elements 71, each of which is arranged for removing, retaining and delivering a container.

Each handling element 71 comprises a gripping element 74, for example shaped as a gripper and arranged for grasping a neck zone of the container.

Each handling element 71 comprises a first arm 72 rotatably supported by the rotating body 70 and a second arm 73 rotatably supported by the first arm 72, the gripping element 74 being connected to the second arm 73.

The transferring device 11 comprises a first driving arrangement, arranged for moving the first arm 72 with respect to the rotating body 70 and a second driving arrangement arranged for moving the second arm 73 with respect to the first arm 72.

In one embodiment, the first driving arrangement comprises a first revolving element rotatably connected to the first arm 72 and engaging with a first cam arranged in a fixed position with respect to the rotating body 70 and the second driving arrangement comprises a second revolving element rotatably connected to the second arm 73 and engaging with a second cam arranged in a fixed position with respect to the rotating body 70.

The handling elements 71 maintain the containers spaced apart from one another. This enables damage to the containers to be avoided even if they are removed from the blow-moulding carousel when the plastics from which they are formed are still at a high temperature, and consequently, the containers are easily deformable.

The handling elements 71 are conformed in such a manner as to maintain the containers at a set distance from one another.

The handling elements 71 thus remove the containers from the blow-moulding carousel 7 according to a preset removal step and deliver the containers to the filling carousel 10 according to a preset delivery step (the removal step and the delivery step being able to be the same as or different from one another).

The blow-moulding carousel 7 and the filling carousel 10, can thus function in a synchronous manner, which enables the efficiency of the apparatus 1 to be optimised.

In one embodiment, rather than a single transferring device 11 a plurality of transferring devices arranged one after the other can be provided.

The blow-moulding carousel 7 is provided in a dry zone of the apparatus 1, whilst the filling carousel 10 zone is provided in a wet zone of the apparatus 1. Inside the wet zone sanitising treatments take place.

The transferring device 11, or the plurality of transferring devices, enable the aforesaid dry zone to be separated and spaced apart from the aforesaid wet zone. The aforesaid wet zone is maintained in slight overpressure—for example with sanitised air—with respect to the aforesaid dry zone.

The transferring device 11, or the plurality of transferring devices, by retaining the containers on board for a certain period of time, ensure that the containers are suitably cooled before filling. For this purpose, the transferring device 11, or the plurality of transferring devices, may comprise nozzles that direct jets of cooling fluid to the containers, in particular to a bottom zone of the containers, whilst the containers are supported and moved by the handling elements 71. The apparatus 1 further comprises a capping carousel 12 provided with a capping device arranged for applying caps to the containers filled with the product.

The apparatus 1 further comprises a labelling carousel 13 provided with an applicating device arranged for applying labels to the containers filled with the product.

The apparatus 1 is further provided with a third transfer carousel 14 arranged for removing the containers from the filling carousel 10 and delivering the containers to the capping carousel 12.

The apparatus 1 is further provided with a fourth transfer carousel 15 arranged for removing the containers from the capping carousel 12 and delivering the containers to the labelling carousel 13.

According to one operating mode, the preforms, rather than being blown immediately after compression-moulding, can be removed from the apparatus 1—for example at the second transfer carousel 9—by a bypass device. In this case, the preforms, in the thermal conditioning device, are subjected to cooling that stabilises the shape thereof. After cooling, the preforms can be stored inside a container and moved without suffering damage or deformation.

The blow-moulding carousel 7 can be supplied, instead of with preforms coming directly from the compression-moulding carousel 3, with cold preforms, for example made previously by the compression-moulding carousel 3—and subsequently cooled—or manufactured by a different forming device. In this case, the preforms can be introduced inside the thermal conditioning device 17, which heats the preforms in such a manner as to prepare the preforms for subsequent blowing. This operating mode can be applied for particular types of containers—and thus of preforms—that have to be produced in a limited number of examples.

Similarly, according to a further operating mode, the containers, rather than being filled immediately after blowing, can be removed from the apparatus 1—for example at the transferring device 11—by a further bypass device.

The filling carousel 10 can be supplied, rather than with containers coming directly from the blow-moulding carousel 7, with containers manufactured previously.

Figure 3:
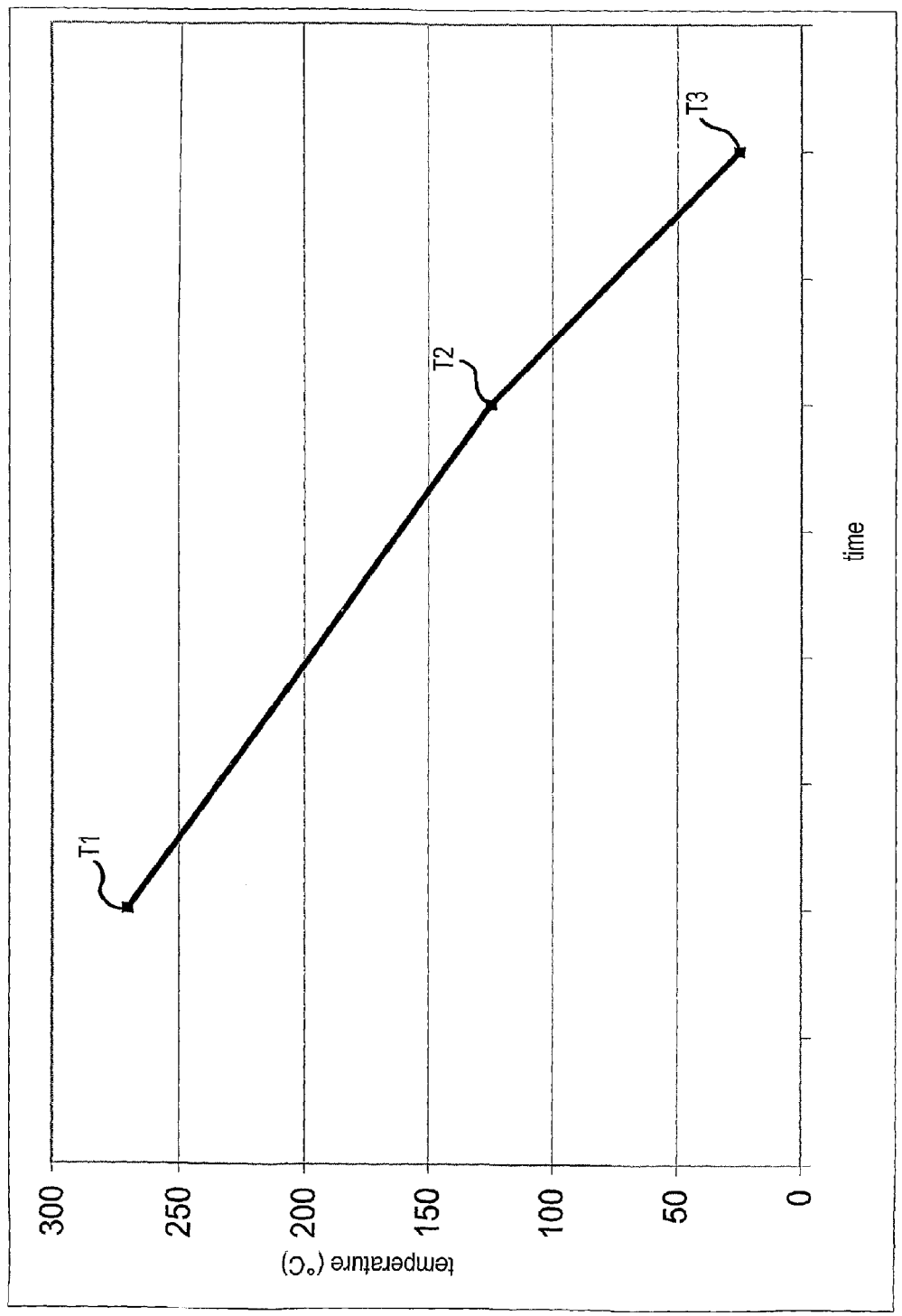
FIG. 3 is a graph that shows how the temperature of the plastics varies over time during the plastics dispensing step, during the preform compression-moulding step, during the preform expansion step to obtain a container and during the container-filling step.

As shown in FIG. 3, the dispensing temperature $T_1$, i.e. the temperature of the plastics when they are dispensed by the plasticising device, is greater than the blowing temperature $T_2$, i.e. than the temperature of the plastics when the preforms are expanded to obtain the containers. The blowing temperature $T_2$ is in turn greater than the filling temperature $T_3$, i.e. than the temperature of the plastics when the containers are filled with the product.

This enables the product to be packaged in the containers in an hygienic manner. The dispensing temperature $T_1$ is in fact sufficiently high to ensure the elimination of the microorganisms. As the plastics extruded at high temperature are immediately compression-moulded to obtain the preforms, the preforms are immediately expanded to obtain the containers and the containers are immediately filled, the preforms are not contaminated before blowing and the containers are not contaminated before filling.

If the product is colder than the container intended to receive the product, the product contributes to cooling the plastics to the filling temperature $T_3$. This enables the manufacturing cycle of the container to be decreased and the cooling modes to be simplified.

Figure 4:
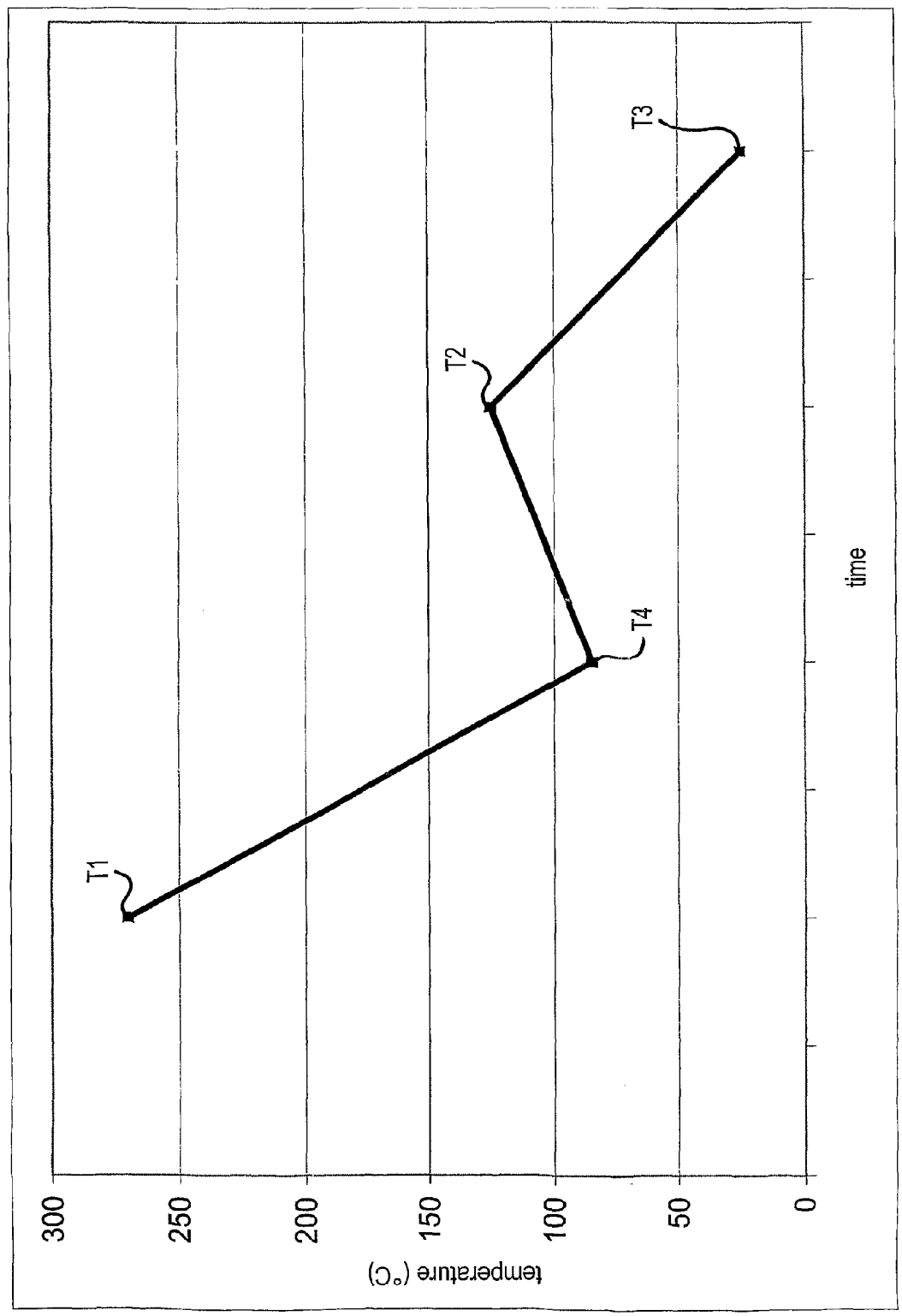
FIG. 4 is a graph like that in FIG. 3 that further shows how the temperature of the plastics varies over time during a thermal conditioning step of the preform, interposed between the preform forming step and the preform expansion step.

As shown in FIG. 4, the preforms can be cooled to a thermal treatment temperature $T_4$ that is less than the blowing temperature $T_2$ and be subsequently heated to the blowing temperature $T_2$.

The preforms, after being extracted from the compression-moulding moulds 4, are provided with walls that bound the body of the preform provided with an internal zone having a greater temperature and with external zones having a lesser temperature.

Cooling the preforms to the thermal treatment temperature $T_4$ and subsequent heating to the blowing temperature $T_2$ enables the difference between the temperature of the aforesaid internal zone and the temperature of the aforesaid external zones to be reduced and possibly to be substantially eliminated. This effect is obtained because the preforms, after being cooled to the thermal treatment temperature $T_4$, are heated with a heating device that acts by giving heat to the aforesaid external zones until the temperature of such external zones differs by little from, or substantially equals, the temperature of the aforesaid internal zone.

A substantially uniform temperature profile through the thickness of the walls that bound the body of the preforms constitutes a condition that enables the blowing or stretch-blowing of the preforms to be optimised.

Heating from the thermal treatment temperature T4 to the blowing temperature T2 occurs in a controlled manner, in particular enabling the heat to spread through the thickness of the preforms to prevent the aforesaid heat causing overheating of the external surface of the preforms with respect to the immediately underlying layer.

Cooling the preforms to the thermal treatment temperature T4 and subsequent heating to the blowing temperature T2 is conducted in the thermal conditioning device 17. The thermal conditioning device 17 is provided with heating elements, for example with infrared heating elements. The heating elements can perform differentiated heating of the preforms, i.e. heat different zones of the preforms in a differentiated manner. In one operating mode, zones of the preforms having a greater thickness are heated more than zones of the preforms having a lesser thickness. In a further operating mode, zones of the preforms intended for being more deformed during expansion are heated more than zones intended for being less deformed during expansion.

The dispensing temperature T1 can be greater than the blowing temperature T2 by an amount comprised between 50 and 195° C. and in particular by an amount comprised between 65 and 175° C.

The blowing temperature T2 can be greater than the filling temperature T3 by an amount comprised between 30 and 130° C. and in particular by an amount comprised between 70 and 120° C.

The thermal treatment temperature T4 can be less than blowing temperature T2 by an amount comprised between 5 and 85° C. and in particular between 20 and 50° C.

It has been ascertained experimentally that the temperature differences indicated above enable good results to be obtained.

Experiments conducted have enabled optimal temperature ranges to be achieved.

The dispensing temperature T1 can be comprised in the range between 190-295° C.

For polyethyleneterephthalate (PET) the dispensing temperature T1 is in particular comprised in the range between 250-285° C. and more in particular in the range between 265-275° C.

For polypropylene (PP) the dispensing temperature T1 is in particular comprised in the range between 190-230° C. and more in particular in the range between 200-210° C.

The blowing temperature T2 can be comprised in the range between 90-140° C.

For polyethyleneterephthalate (PET) the blowing temperature T2 is in particular comprised in the range between 90-115° C. and more in particular in the range between 100-105° C.

For polypropylene (PP) the blowing temperature T2 is in particular comprised in the range between 125-140° C. and more in particular in the range between 130-135° C.

The filling temperature T3 can be comprised in the range between 10-60° C. and in particular in the range between 15-30° C.

For polyethyleneterephthalate (PET) the thermal treatment temperature T4 is in particular comprised in the range between 50-85° C. and more in particular in the range between 65-80° C.

For polypropylene (PP) the thermal treatment temperature T4 is in particular comprised in the range between 55-120° C. and more in particular in the range between 85-110° C.

With reference to FIGS. 5 to 10 there is shown an apparatus 101 comprising a plasticising device, for example an extruder 102, arranged for dispensing plastics in a pasty state. A cutting device is associated with the extruder 102, which is not shown, that divides the plastics into doses D.

The apparatus 101 further comprises a forming carousel 120 provided with a plurality of forming moulds 121—for example positioned at constant angular intervals on a peripheral zone of the forming carousel 120—arranged for compression-moulding the doses D to obtain preforms P and for expanding the preforms P to obtain containers C.

Each forming mould 121 comprises a punch 122 that cooperates alternatively with a compression-moulding die 123 for compression-moulding a dose D to obtain a preform P and with a blow-moulding die 124 for expanding the preform P to obtain a container C.

The forming mould 121 further comprises a neck-forming arrangement 125 arranged for compression-moulding a neck portion of the preform P that is not subsequently deformed when the preform P is expanded.

The compression-moulding die 123 comprises a cavity 126 arranged for receiving the dose D. The compression-moulding die 123 is movable along a longitudinal axis of the forming mould 121.

The blow-moulding die 124 comprises a first half mould 127 and a second half mould 128 that are movable towards and away from one another transversely to the longitudinal axis of the forming mould 121.

Figure 7:
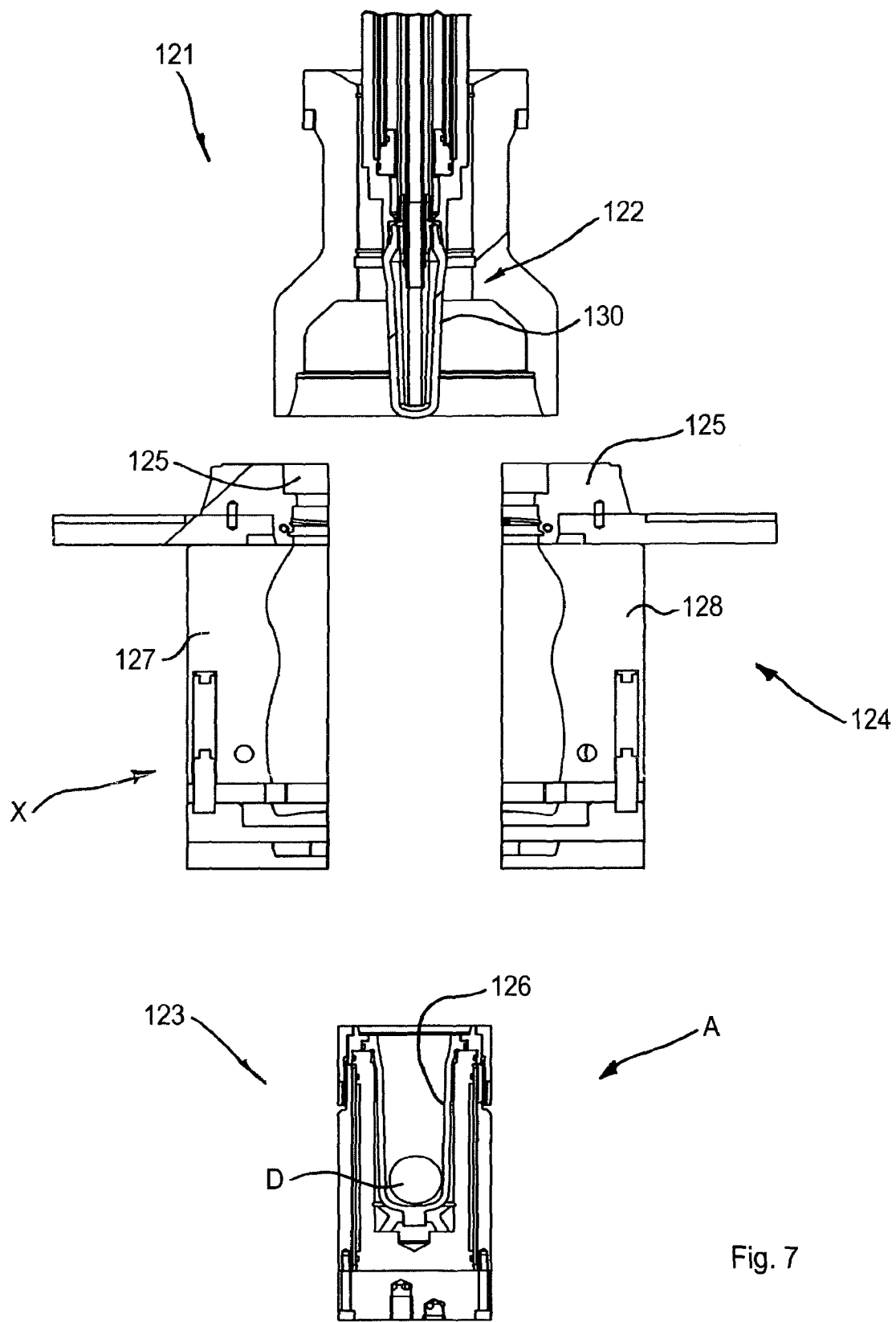

FIG. 7 shows a step of an operating cycle of the forming mould 121 in which the compression-moulding die 123 is in a lowered position A, in which it does not interact with the punch 122, the blow-moulding die 124 is in an open configuration X, in which the first half mould 126 and the second half mould 127 are spaced away from one another, and a dose D has been introduced inside the cavity 126.

Figure 8:
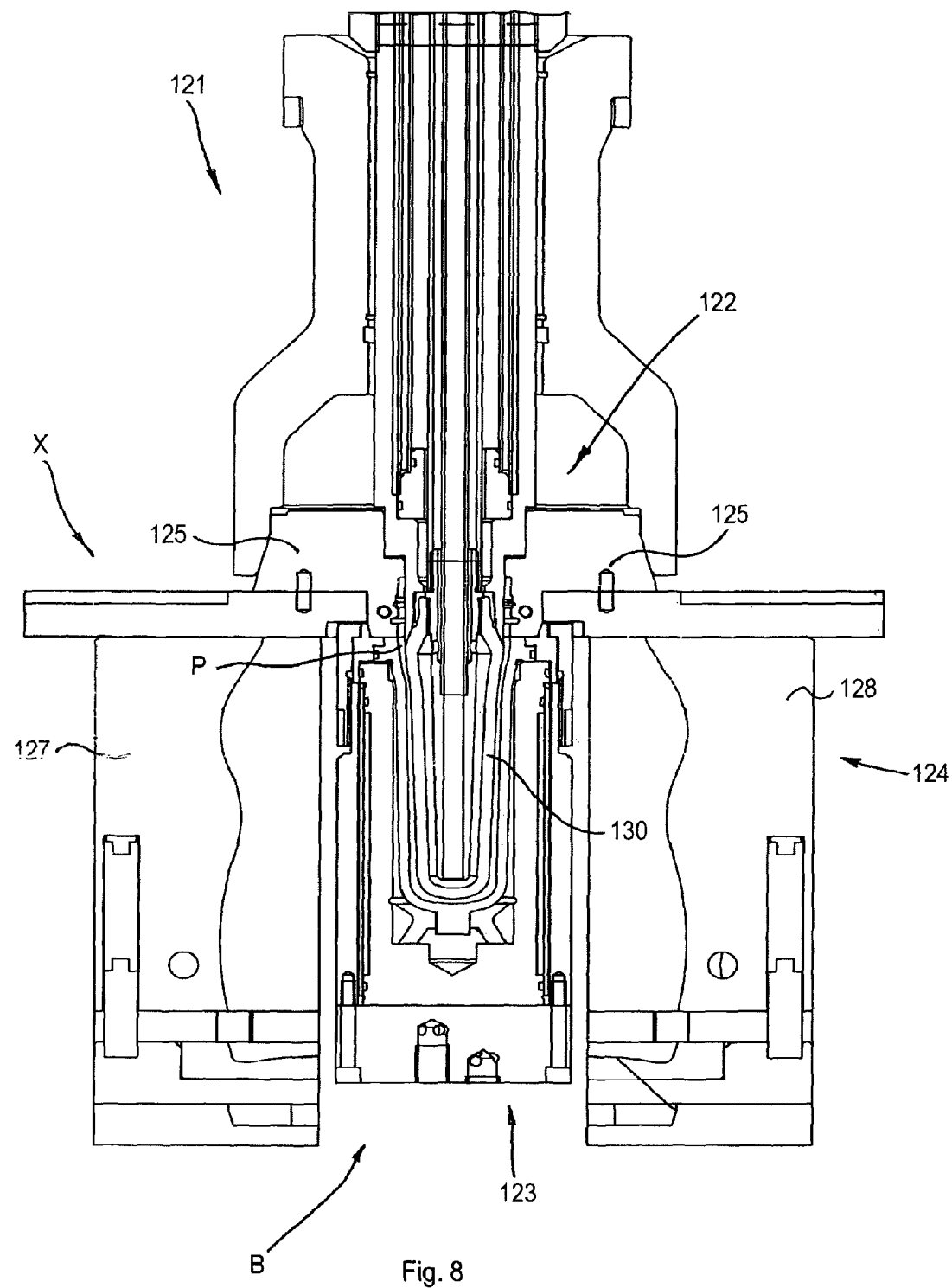

FIG. 8 shows a subsequent step of the operating cycle of the forming mould 121 in which the compression-moulding die 123 is in a raised position B in which it cooperates with the punch 122 and with the neck-forming arrangement 125 to compression-mould the dose D to obtain the preform P. The blow-moulding die 124 is maintained in the open configuration X to enable the compression-moulding die 123 to move along the longitudinal axis of the forming mould 121 to move from the lowered position A to the raised position B.

FIG. 9 shows a subsequent step of the operating cycle of the forming mould 121 in which the compression-moulding die 123 has moved from the raised position B to the lowered position A. The preform P is retained by the neck-forming arrangement 125. The punch 122 is maintained inside the preform P.

Figure 10:
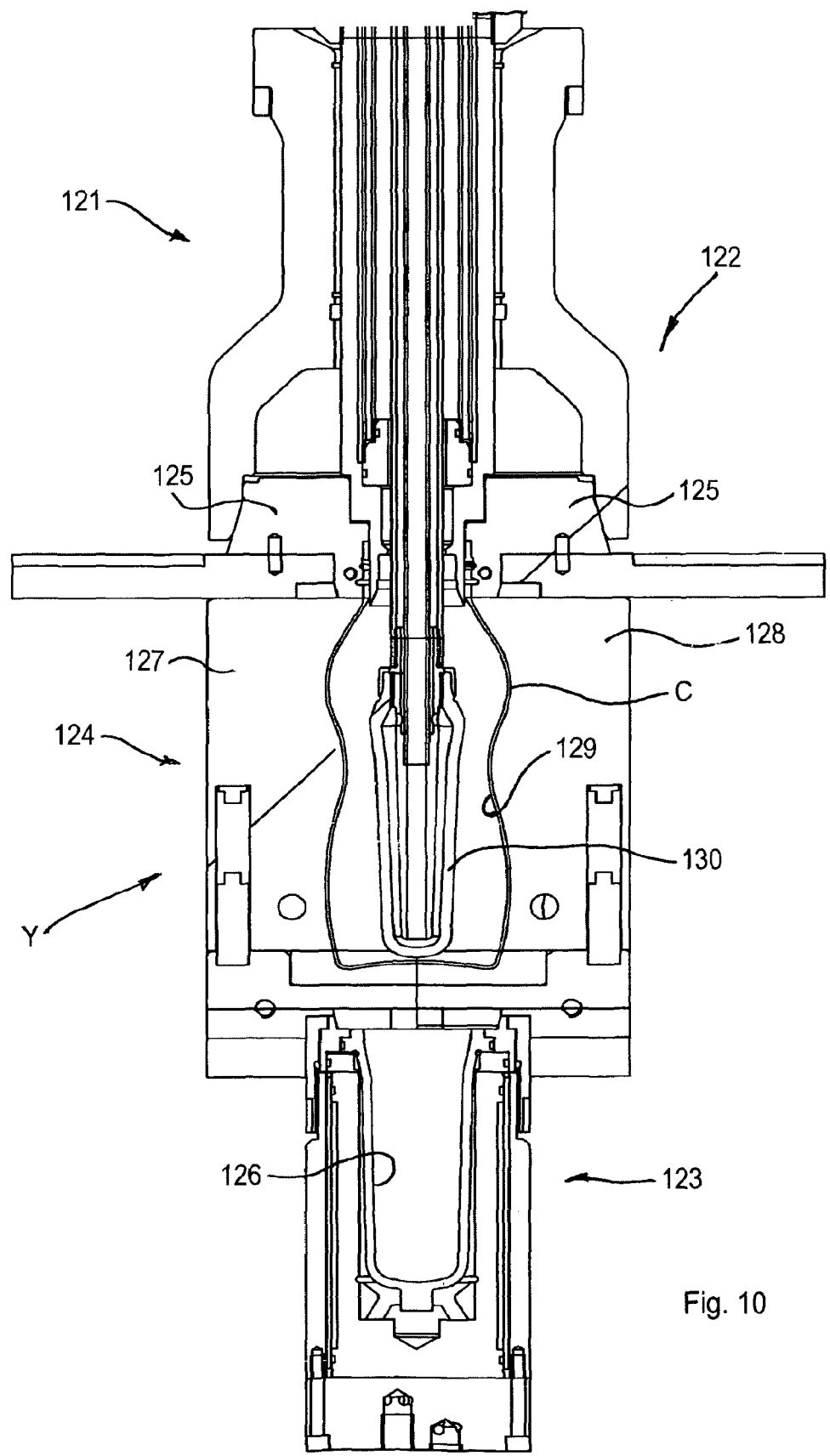

FIG. 10 shows a subsequent step of the operating cycle of the forming mould 121 in which the blow-moulding die 124 is in a closed configuration Y in which the first half mould 127 and the second half mould 128 define a forming chamber 129 having the shape of the container C that has to be obtained.

A forming element 130 of the punch 122 penetrates inside the forming chamber 129 to stretch the preform P. Simultaneously, the preform P is blown by a forming fluid—for example air—dispensed through conduits obtained in the punch 122, in particular in the forming element 130. Alternatively, the preform P can be expanded only through the action of the forming fluid, i.e. without the stretching action exerted by the forming element 130.

In subsequent steps of the operating cycle of the forming mould 121, the blow-moulding die 124 moves from the closed configuration Y to the open configuration X and the neck-forming arrangement 125 releases the container C. In this manner, the container C can be removed from the forming mould 121 and the forming mould 121 can start a new operating cycle.

The apparatus 1 further comprises a moving carousel 131 interposed between the extruder 2 and the forming carousel 120. The moving carousel 131 removes the doses D from the extruder 102 and inserts the doses D into the forming moulds 121. The moving carousel 131 further removes the containers C from the forming moulds 121. On the moving carousel 131, the containers are positioned according to an angular step that has rather a wide extent. This is due to the fact that the forming moulds 121, owing to the significant overall dimensions thereof, have to be spaced apart by rather wide angles on the forming carousel 120.

In order to optimise the operation of the devices of the apparatus positioned downstream of the forming carousel 120 it is appropriate to modify, and in particular reduce the distance between the containers C. This enables, for example, more efficient exploitation of the spaces in the aforesaid devices, inasmuch, with the same dimensions of the devices, the number of containers C increases that can be processed simultaneously by the same device.

For this purpose, the apparatus 1 is provided with a step-varying carousel 132 that removes the containers C from the moving carousel 131 according to a removal step and delivers the containers C to a conveying device 133 according to a delivery step that is less than the removal step.

Figure 5:
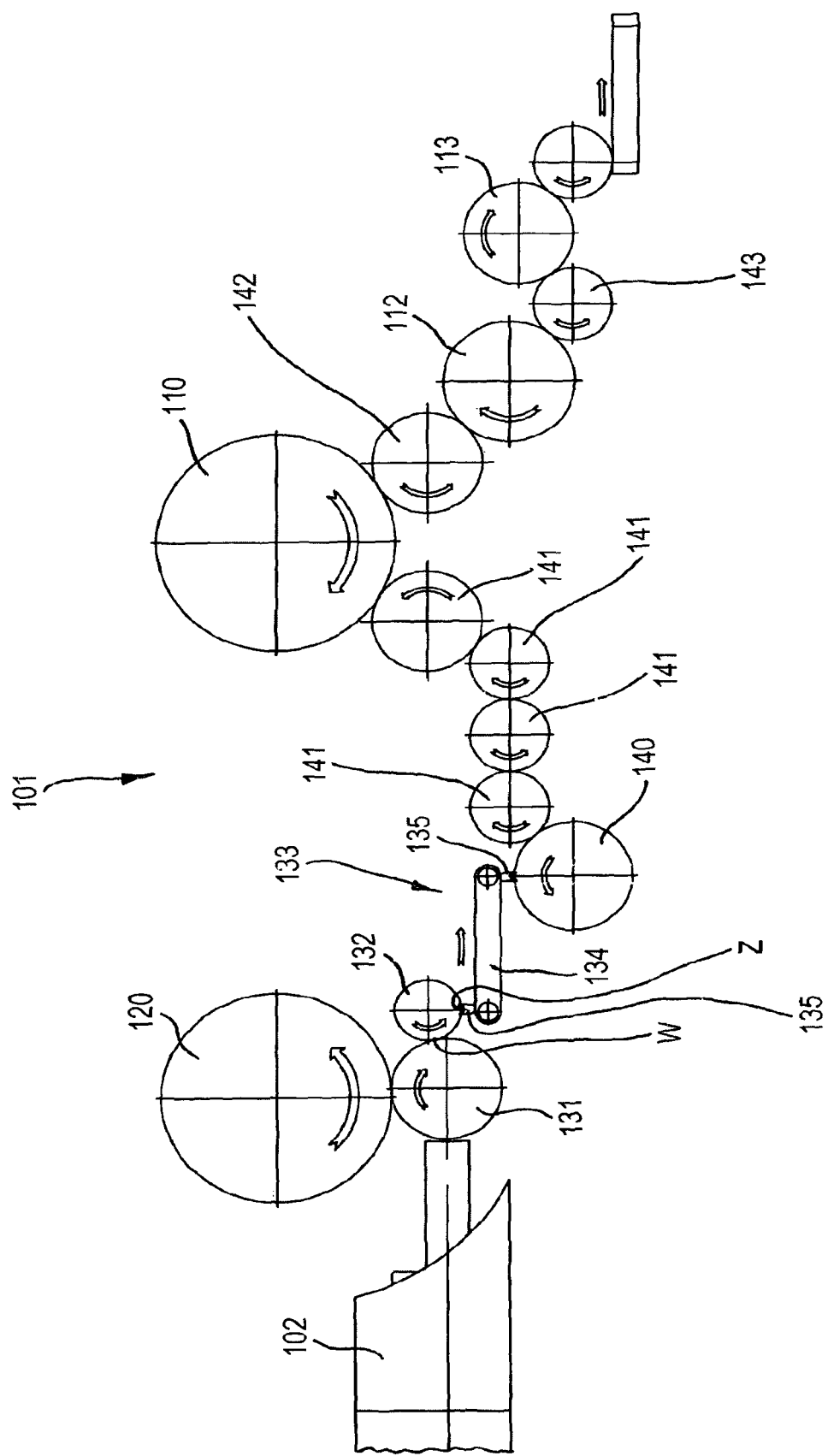
FIG. 5 is a schematic layout of a further embodiment of an apparatus for forming preforms made of plastics, expanding the preforms to obtain containers and filling the containers with a product.
Figure 6:
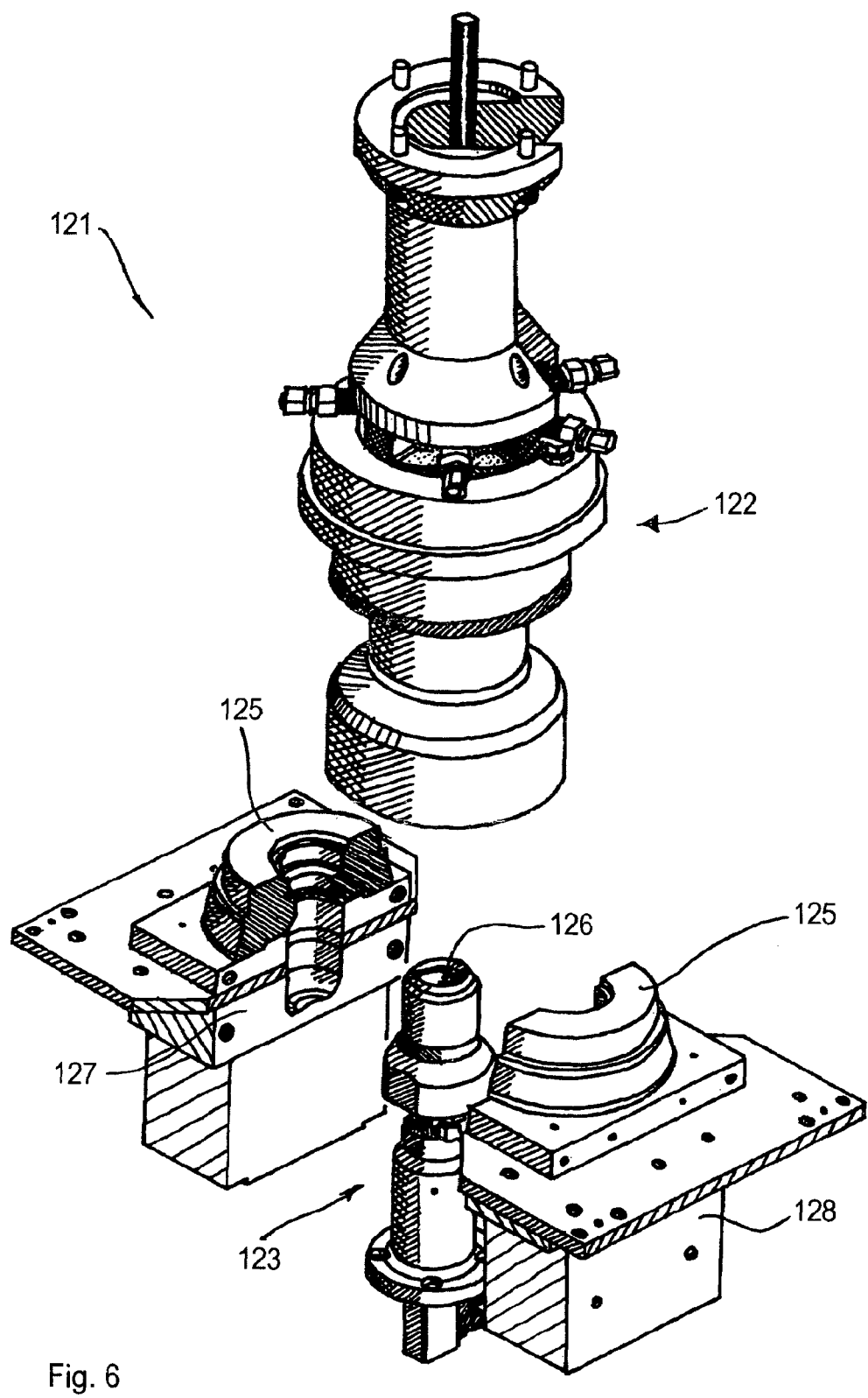
FIG. 6 is a perspective view of a mould of the apparatus in FIG. 5 arranged for compression-moulding a dose of plastics to obtain a preform and for expanding the preform to obtain a container.

The conveying device 133 may comprise a conveyor belt 134 that supports a plurality of retaining elements 135, for example conformed as grippers. In FIG. 5 and in FIGS. 11 to 17 only some of the retaining elements 135 supported by the conveyor belt 134 are shown. Each retaining element 135 is separated from the retaining elements 135 adjacent thereto by a distance corresponding to the delivery step.

The step-varying carousel 132 comprises a rotary driving device, for example a brushless motor, and a command and control unit that enables the rotation speed of the step-varying carousel 132 to be varied.

Figure 11:
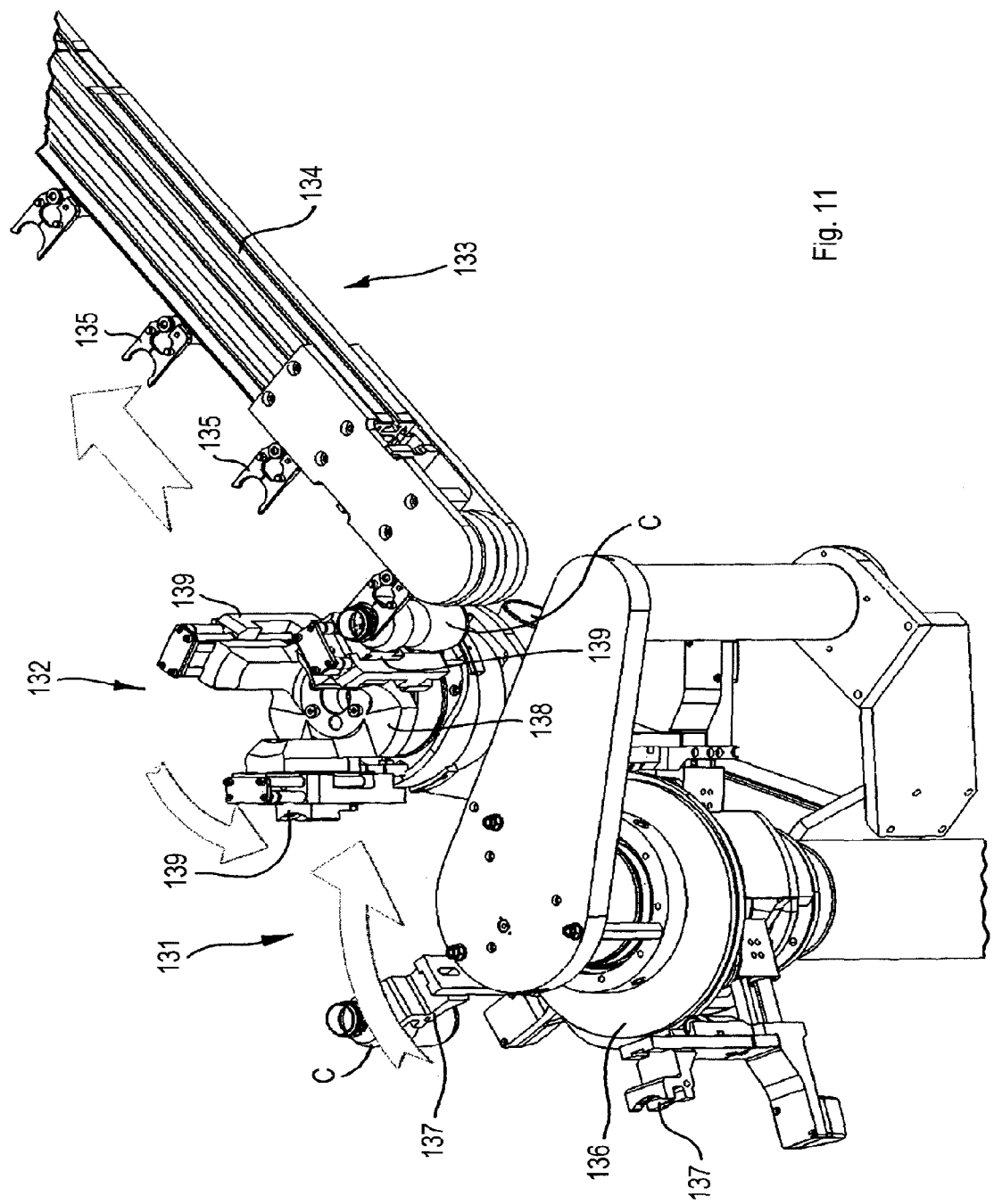
FIG. 11 is a perspective view that shows a moving carousel and a step-varying carousel of the apparatus in FIG. 5.

As shown in FIG. 11, the moving carousel 131 comprises a rotating body 136 from which handling elements 137 project that are intended to remove, retain and deliver the containers C. In the embodiment shown three handling elements 137 are present positioned at angular intervals of 120° with respect to the rotating body 136. The handling elements 137 are provided with a sucking device that enable the handling elements 137 to retain the containers C by depression. Alternatively, other types of retaining devices can be provided, for example a mechanical retaining device.

The step-varying carousel 132 comprises a rotating member 138 from which gripping elements 139 project that are intended to remove, retain and deliver the containers C. In the embodiment shown there are three gripping elements 139 positioned at angular intervals of 120° with respect to the rotating member 138. The gripping elements 139 are provided with a sucking device that enable the gripping elements 139 to retain the containers C by depression. Alternatively, retaining devices of other types can be provided, for example a mechanical retaining device.

The moving carousel 131 and the step-varying carousel 132 are positioned in such a manner that, when the rotating body 136 and the rotating member 138 are rotated, the handling elements 137 and the gripping elements 139 define respective circular trajectories that are substantially tangential at a point W near which the containers C are transferred from the moving carousel 131 to the step-varying carousel 132.

FIGS. 12 to 17 show the moving carousel 131, the step-varying carousel 132 and the conveyor belt 134 in subsequent steps of an operating cycle.

Figure 12:
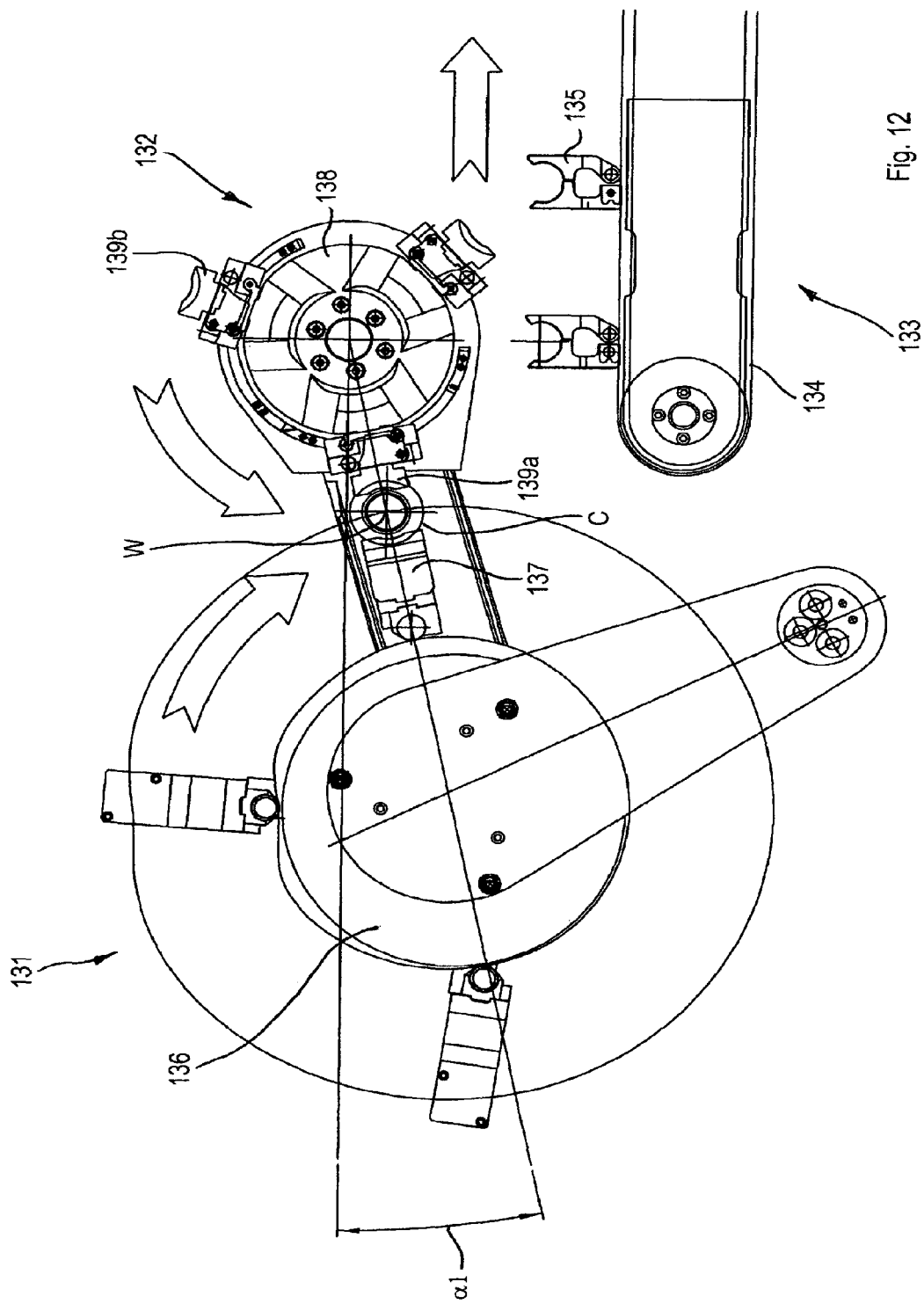
FIGS. 12 to 17 are plan views that show the moving carousel and the step-varying carousel in FIG. 11 in subsequent steps of an operating cycle.

With reference to FIG. 12, there is shown a step of the operating cycle in which, whilst a gripping element 139a runs along an angular portion α1 measured from point W, a container C is exchanged between a moving carousel 131 and the step-varying carousel 132.

Figure 13:
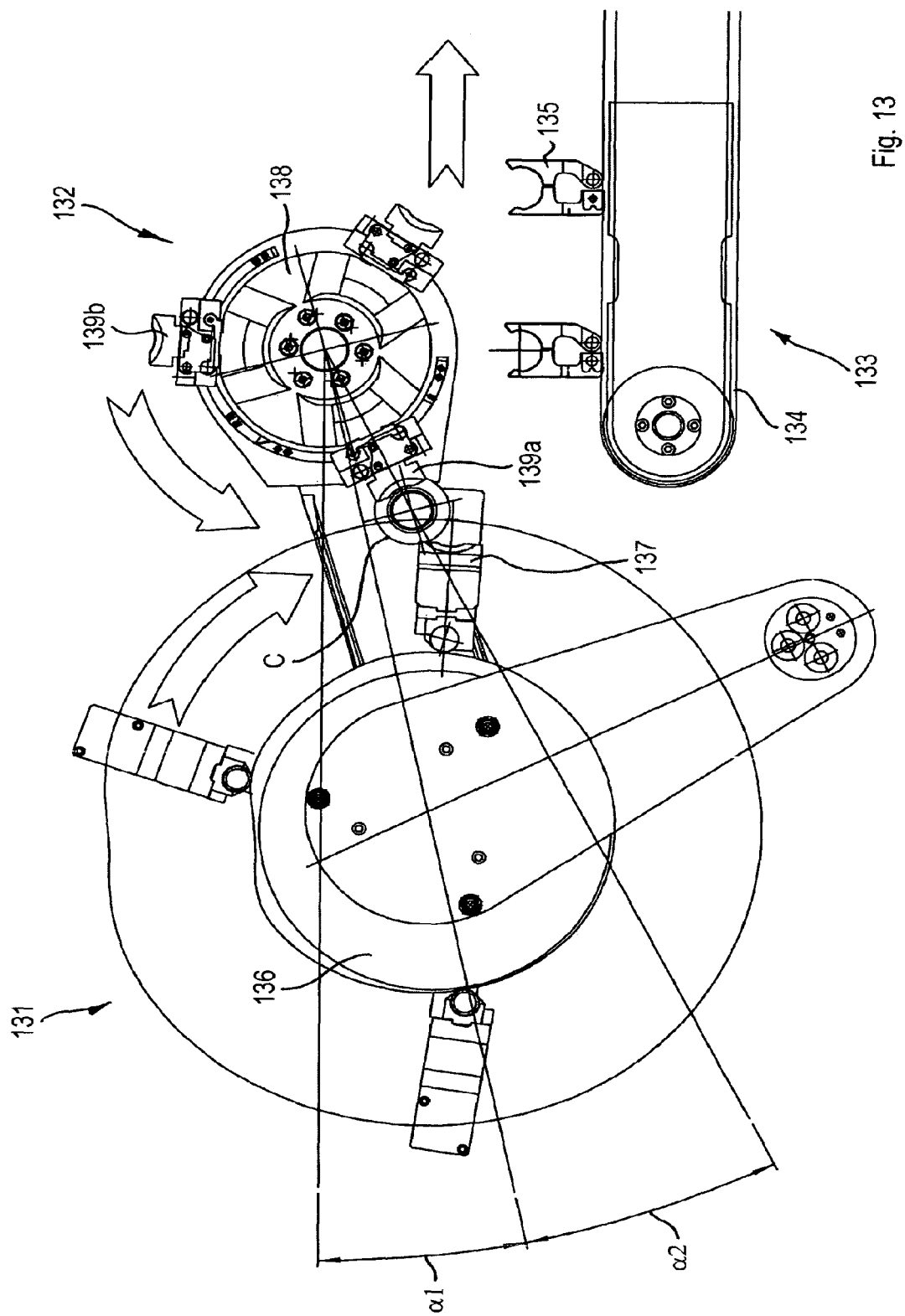

With reference to FIG. 13, there is shown a subsequent step of the operating cycle in which, whilst the gripping element 139a runs along an angular portion α2, the step-varying carousel 132 rotates at a maximum rotation speed.

Figure 14:
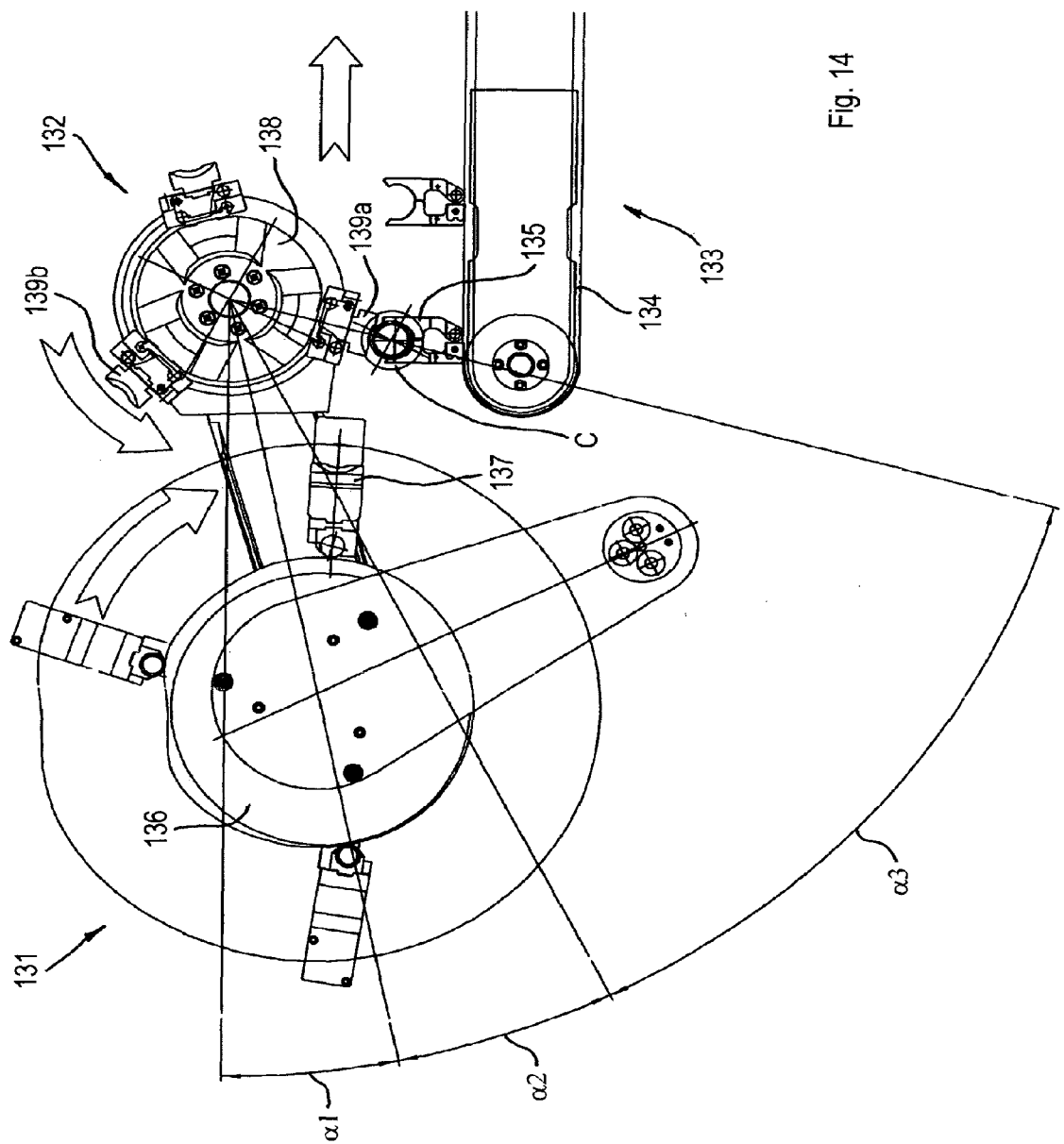

With reference to FIG. 14, there is shown a subsequent step of the operating cycle in which, whilst the gripping element 139a runs along an angular portion α3, the step-varying carousel 132 decelerates to step from the maximum rotation speed to a minimum rotation speed.

Figure 15:
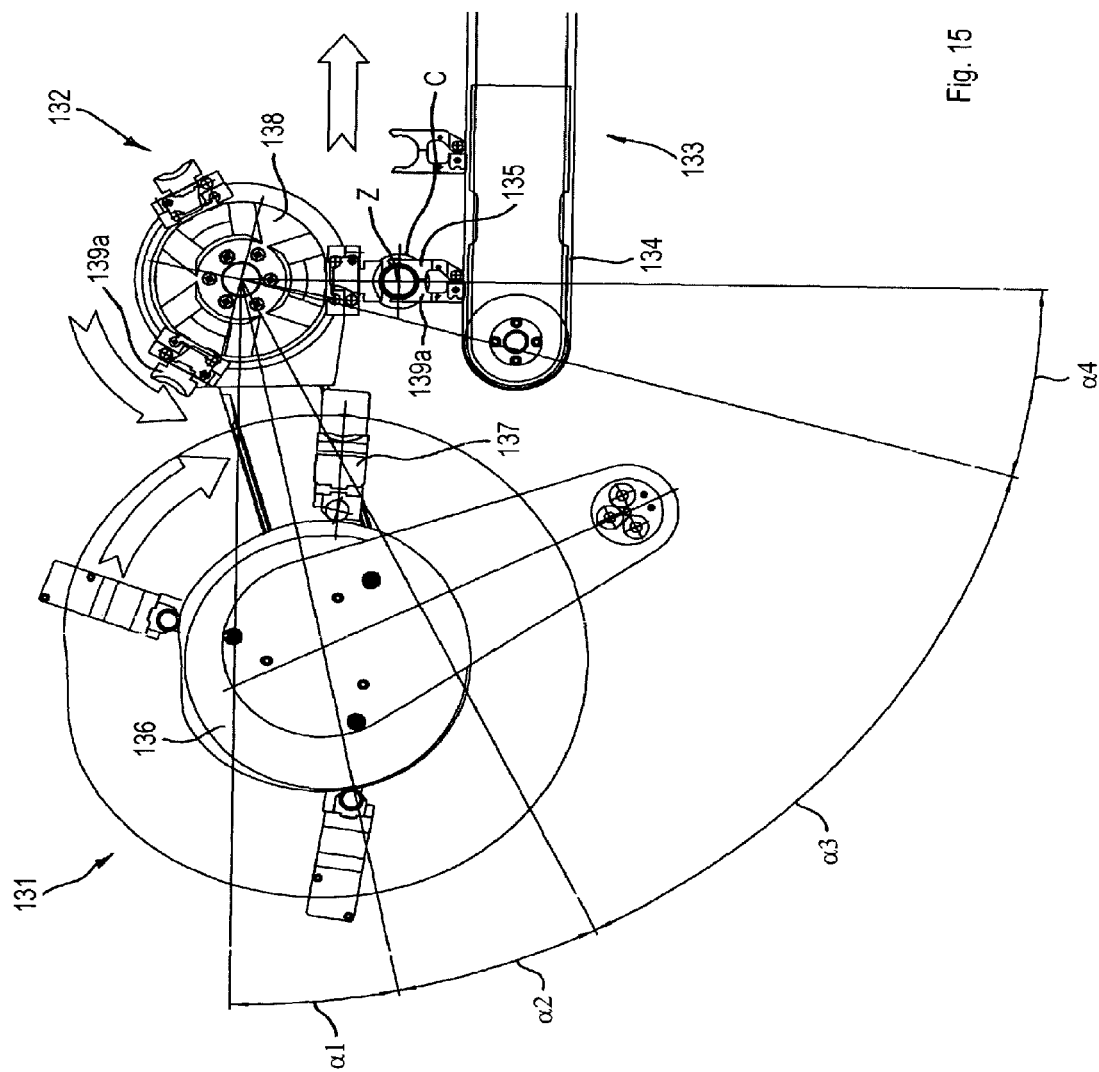

With reference to FIG. 15, there is shown a subsequent step of the operating cycle in which, whilst the gripping element 139a runs along an angular portion α4, the step-varying carousel 132 rotates at a constant speed corresponding to the minimum rotation speed until it reaches a further point Z, near which the container C is given to a retaining element 135 of the conveyor belt 134.

Figure 16:
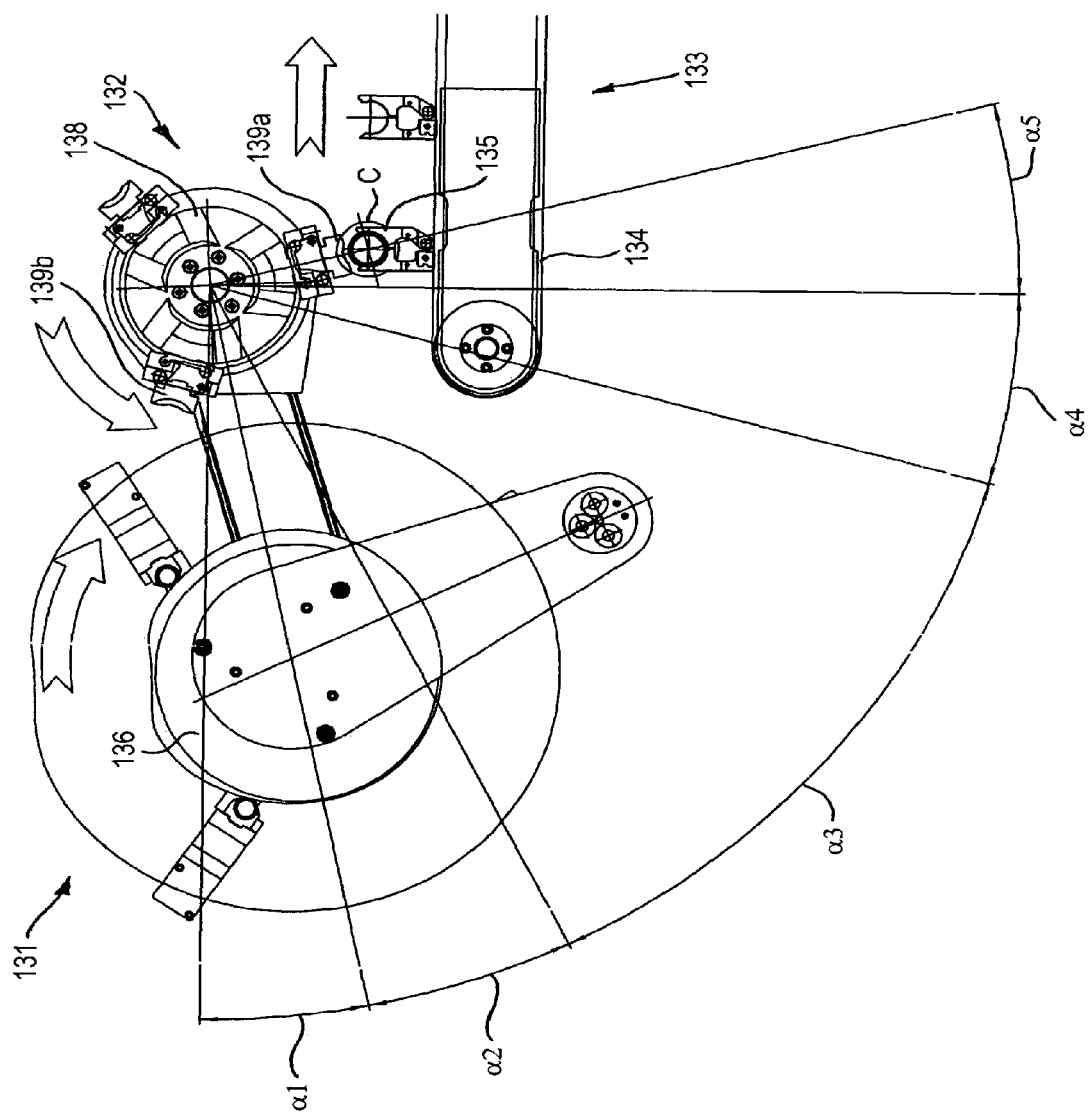

With reference to FIG. 16, there is shown a subsequent step of the operating cycle in which, whilst the gripping element 139a runs along an angular portion α5, the step-varying carousel 132 rotates at a constant speed corresponding to the minimum rotation speed.

Figure 17:
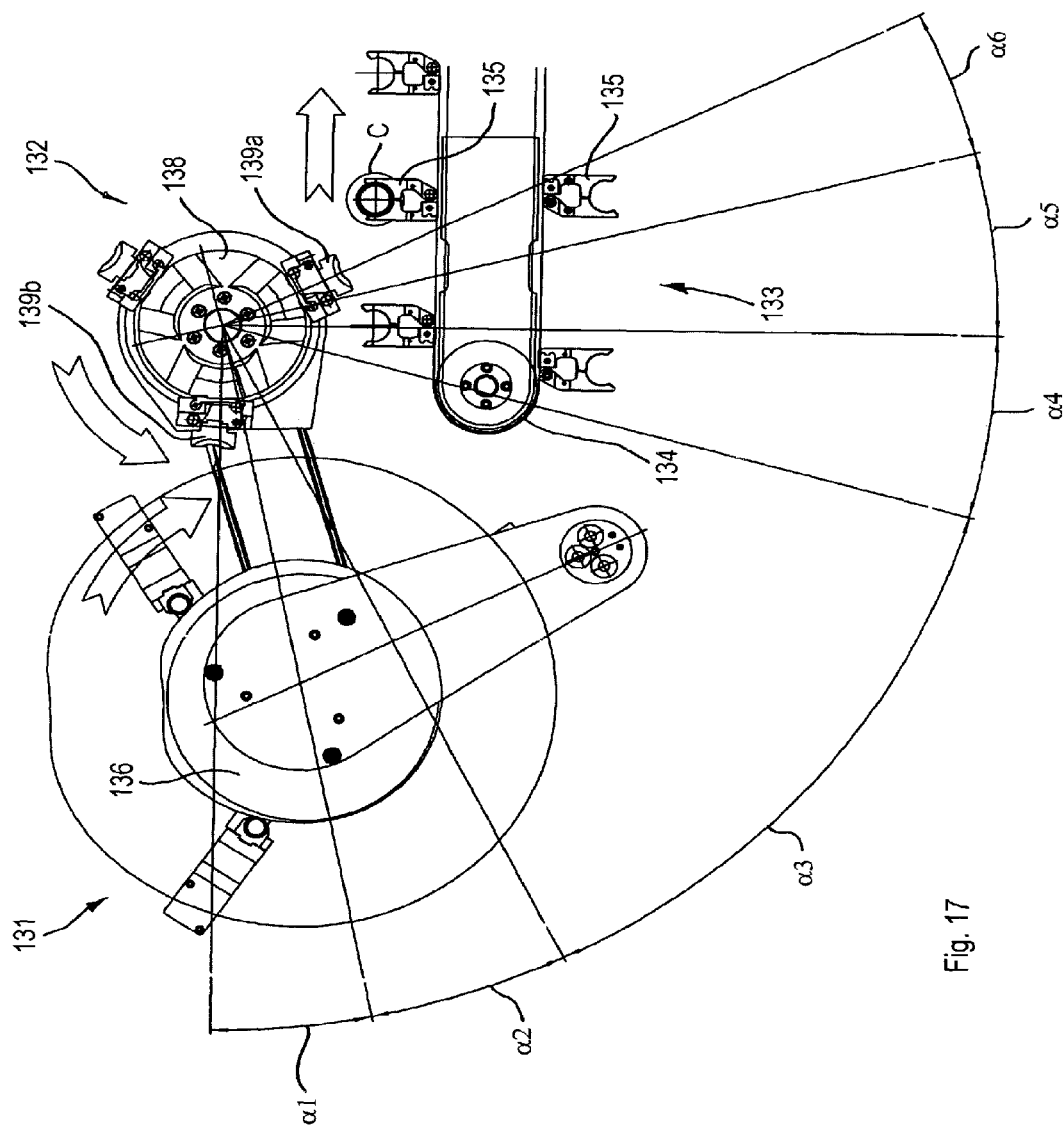

With reference to FIG. 17, there is shown a subsequent step of the operating cycle in which, whilst the gripping element 139a runs along an angular portion α6, the step-varying carousel 132 accelerates to pass from the minimum rotation speed to the maximum rotation speed. In particular, when a further gripping element 139b, arranged downstream of the gripping element 139a with respect to the rotation direction of the step-varying carousel 132, is at point W the step-varying carousel 132 has reached maximum rotation speed.

The apparatus 1 further comprises a cooling and sanitising carousel 140.

The cooling and sanitising carousel 140 cools the containers C, bestowing greater mechanical resistance, in such a manner that the containers C are not deformed in the course of the subsequent operations. This is particularly useful in the case of containers provided with very thick walls, which, at the outlet from the forming carousel 120, may comprise internal zones formed of plastics having a high temperature and, consequently, being easily deformable.

The cooling and sanitising carousel 140 is further provided with nozzles that dispense a sanitising fluid, for example an inert or liquid gas to perform washing of the containers C. The aforesaid washing in particular enables possible odours of plastics to be reduced or even eliminated. In particular, the cooling and sanitising carousel 140 can be received inside a casing that communicates with the outside only through openings of limited extent, arranged to enable the passage of the containers C. The zone enclosed by the aforesaid casing may be maintained in slight overpressure—for example with sanitised air—with respect to the external environment.

Instead of the cooling and sanitising carousel 140 two distinct carousels may be provided, one for cooling and one for sanitising, positioned in succession.

The apparatus 101 further comprises a filling carousel 110 on which a filling device is provided that fills the containers C with a product, this product being able to comprise a liquid material, a material made of powder or granules, a material made of paste and the like. The aforesaid product can be, for example, a food product or a cosmetic product.

The apparatus 101 is provided with a group of first transfer carousels 141—or possibly a single first transfer carousel—by means of which the containers C are removed from the cooling and sanitising carousel 140 and are transferred to the filling carousel 110.

The apparatus 101 further comprises a capping carousel 112 provided with a capping device arranged for applying caps to the containers C filled with the product.

The apparatus 101 is provided with a second transfer carousel 142 arranged for removing the containers C from the filling carousel 110 and delivering the containers C to the capping carousel 112.

The apparatus 101 further comprises a labelling carousel 113 provided with an applicating device arranged for applying labels to the containers C filled with the product.

The apparatus 101 is provided with a third transfer carousel 143 arranged for removing the containers C from the filling carousel 110 and delivering the containers C to the capping carousel 112.

Figure 18:
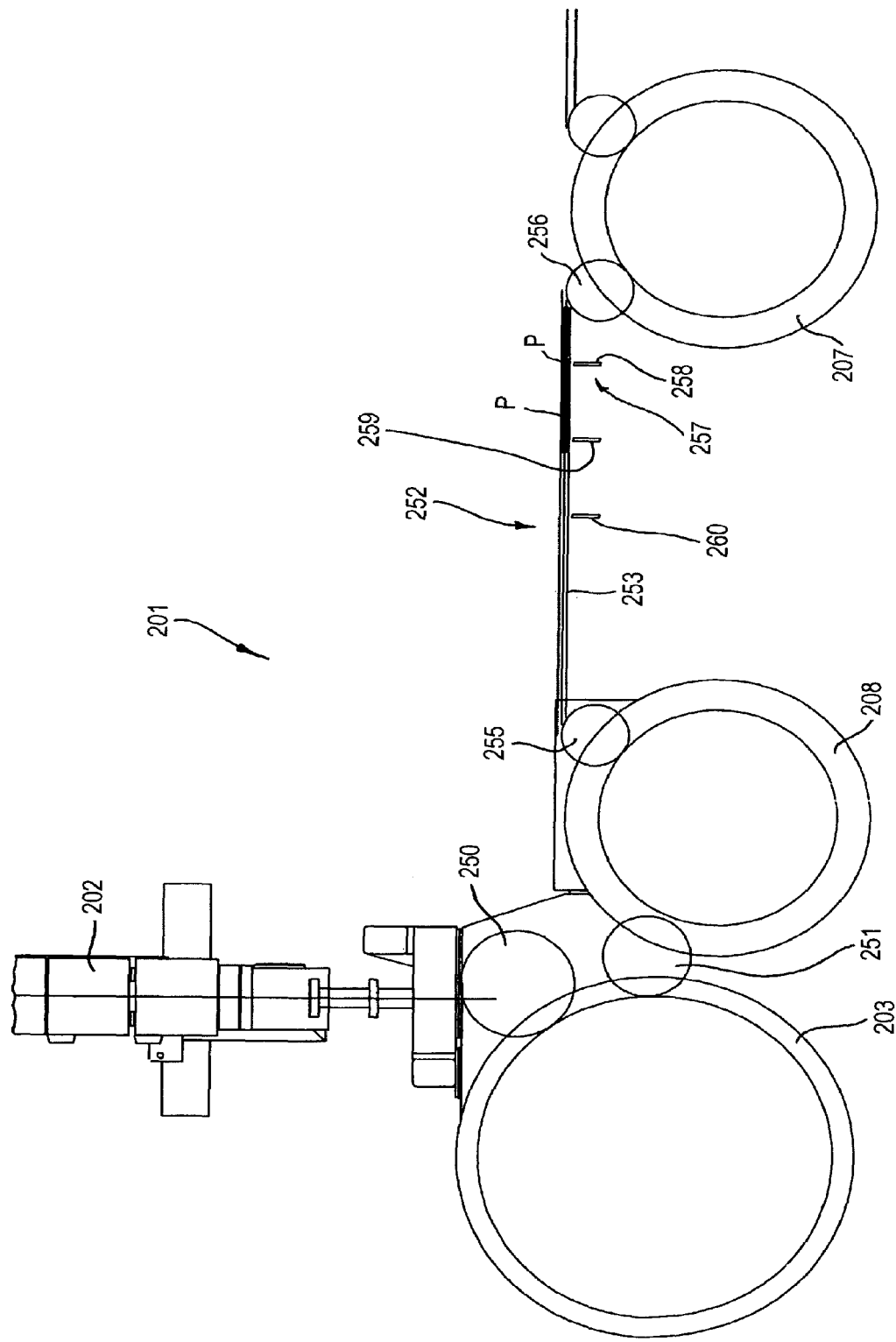
FIG. 18 is a schematic and fragmentary layout of a still further embodiment of an apparatus for forming preforms made of plastics, expanding the preforms to obtain containers and filling the containers with a product.
Figure 19:
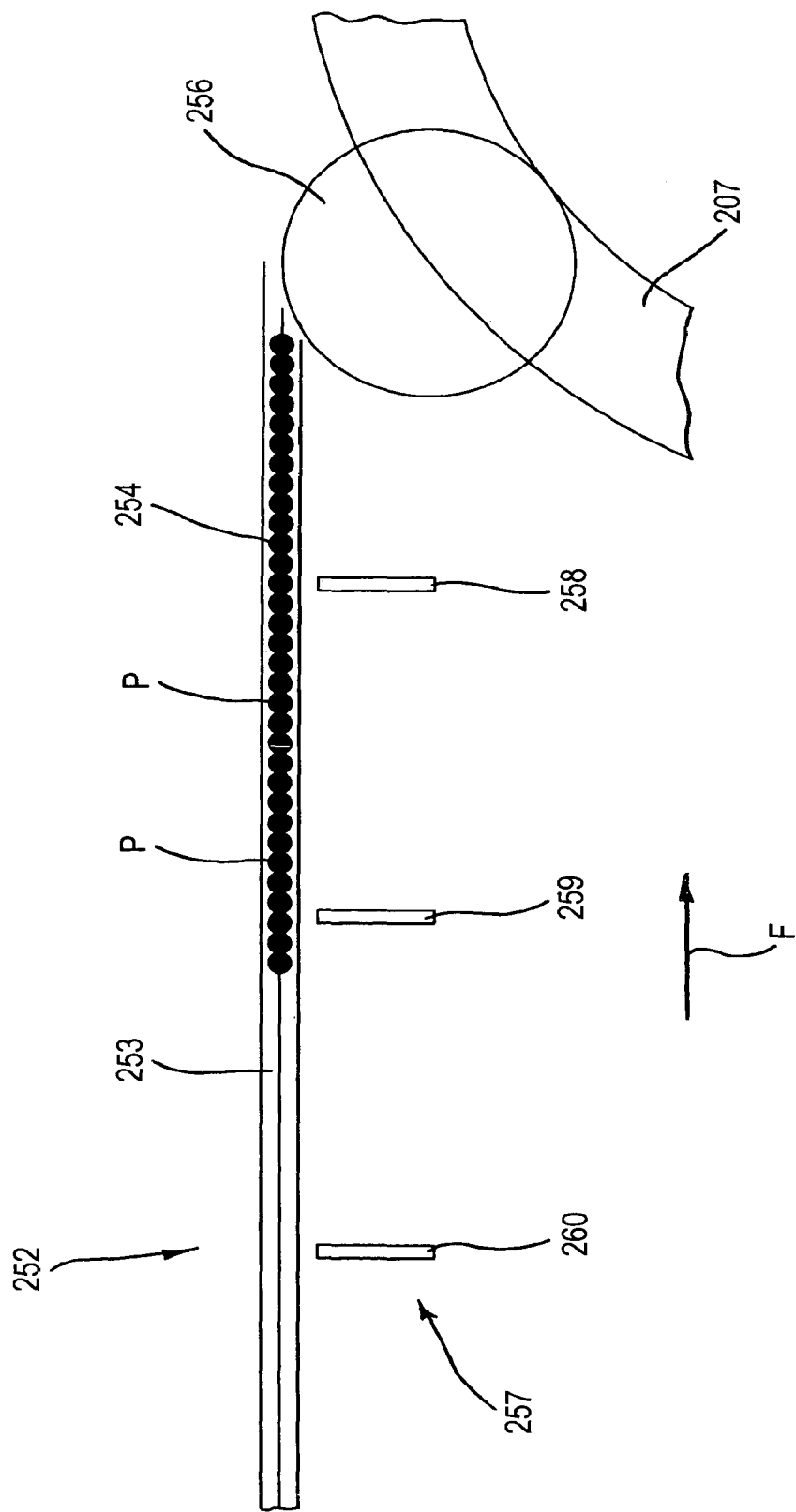
FIG. 19 is a detail of FIG. 18.

With reference to FIGS. 18 and 19 there is shown an apparatus 201 comprising a plasticising device, for example an extruder 202, arranged for dispensing plastics in a pasty state. With the extruder 202 a cutting device is associated, which is not shown, that divides the plastics into doses.

The apparatus 201 further comprises a supplying carousel 250 that removes the doses and delivers the doses to a compression-moulding carousel 203. The compression-moulding carousel 203 supports a plurality of compression-moulding moulds each of which is provided with a female half mould provided with a cavity intended to receive a dose and with a male half mould arranged for being received inside the aforesaid cavity. The male half mould and the female half mould cooperate to shape the dose in such a manner as to obtain preforms P.

The apparatus 201 further comprises a thermal conditioning device arranged for thermally conditioning the preforms P, for example to prepare the preforms P for a subsequent blowing step P.

The thermal conditioning device may comprise a thermal conditioning carousel 208 and/or one or more thermal conditioning tunnels.

The apparatus 201 further comprises a moving carousel 251 that removes the preforms P from the compression-moulding carousel 203 and transfers the preforms to the thermal conditioning carousel 208.

The apparatus 1 further comprises a blow-moulding carousel 207 arranged for blowing the preforms 6 to obtain containers. The blow-moulding carousel 207 comprises a plurality of blow-moulding moulds.

Downstream of the blow-moulding carousel 207 a filling carousel arranged for filling the containers with a product, and a capping carousel for capping the containers filled and a labelling carousel arranged for labelling the filled containers can be provided.

Between the thermal conditioning carousel 208 and the blow-moulding carousel 207 an accumulating arrangement 252 is provided arranged for receiving the preforms P produced by the compression-moulding carousel 203.

In one embodiment, the apparatus 201 does not comprise the thermal conditioning carousel 208. In this case, the accumulating arrangement 252 is interposed between the compression-moulding carousel 203 and the blow-moulding carousel 207.

The accumulating arrangement 252 comprises a channel 253 inside which the preforms P are supplied one after the other to form a row 254. The accumulating arrangement 252 further comprises a moving arrangement that moves the preforms along the channel 253.

The accumulating arrangement 252 may comprise devices that prevent the preforms P from knocking against one another—or devices that soften blows—in such a manner that the preforms P are not damaged during conveying along the channel 253.

The apparatus 201 comprises a first transfer carousel 255 arranged for removing the preforms P from the thermal conditioning carousel 208 and transferring the preforms P to the channel 253 and a second transfer carousel 256 arranged for removing the preforms P from the channel 253 and transferring the preforms P to the blow-moulding machine 207.

The apparatus 201 further comprises a sensor arrangement 257 arranged for detecting the quantity of preforms P present inside the accumulating arrangement means 252.

The sensor arrangement 257 comprises a plurality of sensors arranged in sequence along a direction F along which the preforms P advance along the channel 253.

In particular, the sensor arrangement 257 comprises a first sensor 258, a second sensor 259 and a third sensor 260, the first sensor 258 being nearer the blow-moulding carousel 207, the third sensor 260 being further away from the blow-moulding carousel 207 and the second sensor 259 being interposed between the first sensor 258 and the third sensor 260.

The first sensor 258 detects whether the number of preforms P inside the accumulating arrangement 252 is less than a minimum value, the second sensor 259 provides an indication of the average number of preforms P inside the accumulating arrangement 252 and the third sensor 260 detects whether the number of preforms P inside the accumulating arrangement 252 is greater than a maximum value.

In an embodiment that is not shown, instead of the third sensor 260 a plurality of third sensors can be provided interposed between the first sensor 258 and the second sensor 259.

The following is a possible operating mode.

If the first sensor 258 detects that the number of preforms P inside the accumulating arrangement 252 is less than the aforesaid minimum value—which corresponds to a situation in which the preforms P inside the channel 253 have finished or are finishing—a command and control unit of the apparatus 201, connected to the sensor arrangement 257, stops the blow-moulding carousel 207.

If the third sensor 260 detects that the number of preforms P inside the channel 253 is greater than the aforesaid maximum value, the command and control unit stops the thermal conditioning carousel 208 and the compression-moulding carousel 203.

During normal operation, the command and control unit regulates the speed of the blow-moulding carousel 207 in such a manner that the number of preforms P located inside the accumulating arrangement 252 is comprised between the aforesaid minimum value and the aforesaid maximum value. According to operating mode, if the second sensor 259 does not detect the preforms P the command and control unit decreases the speed of the blow-moulding carousel 207, whereas if the second sensor 259 detects the preforms P the command and control unit increases the speed of the blow-moulding carousel 9.

Figure 20:
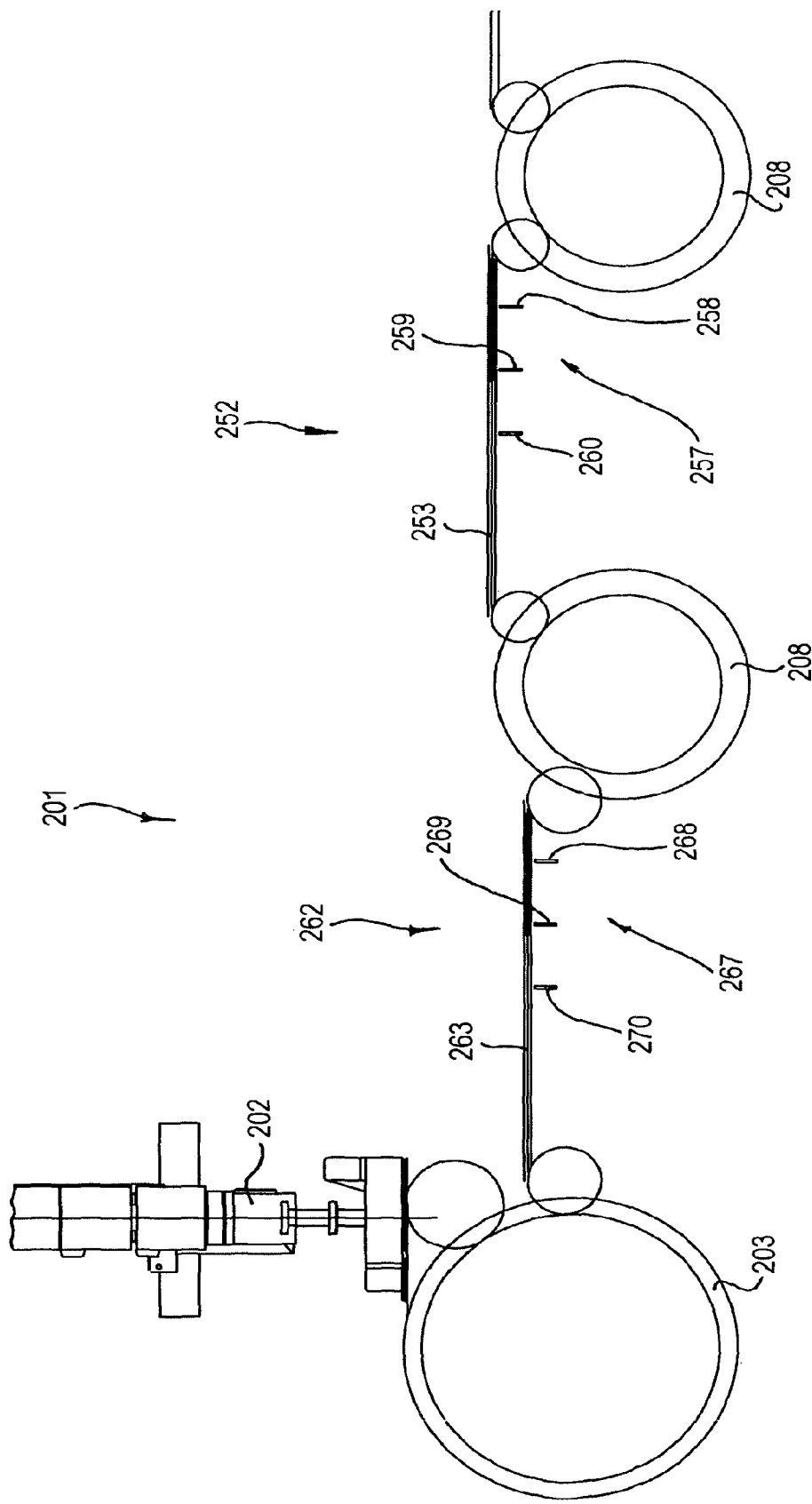
FIG. 20 is a schematic layout of a version of the apparatus shown in FIG. 18.
Figure 21:
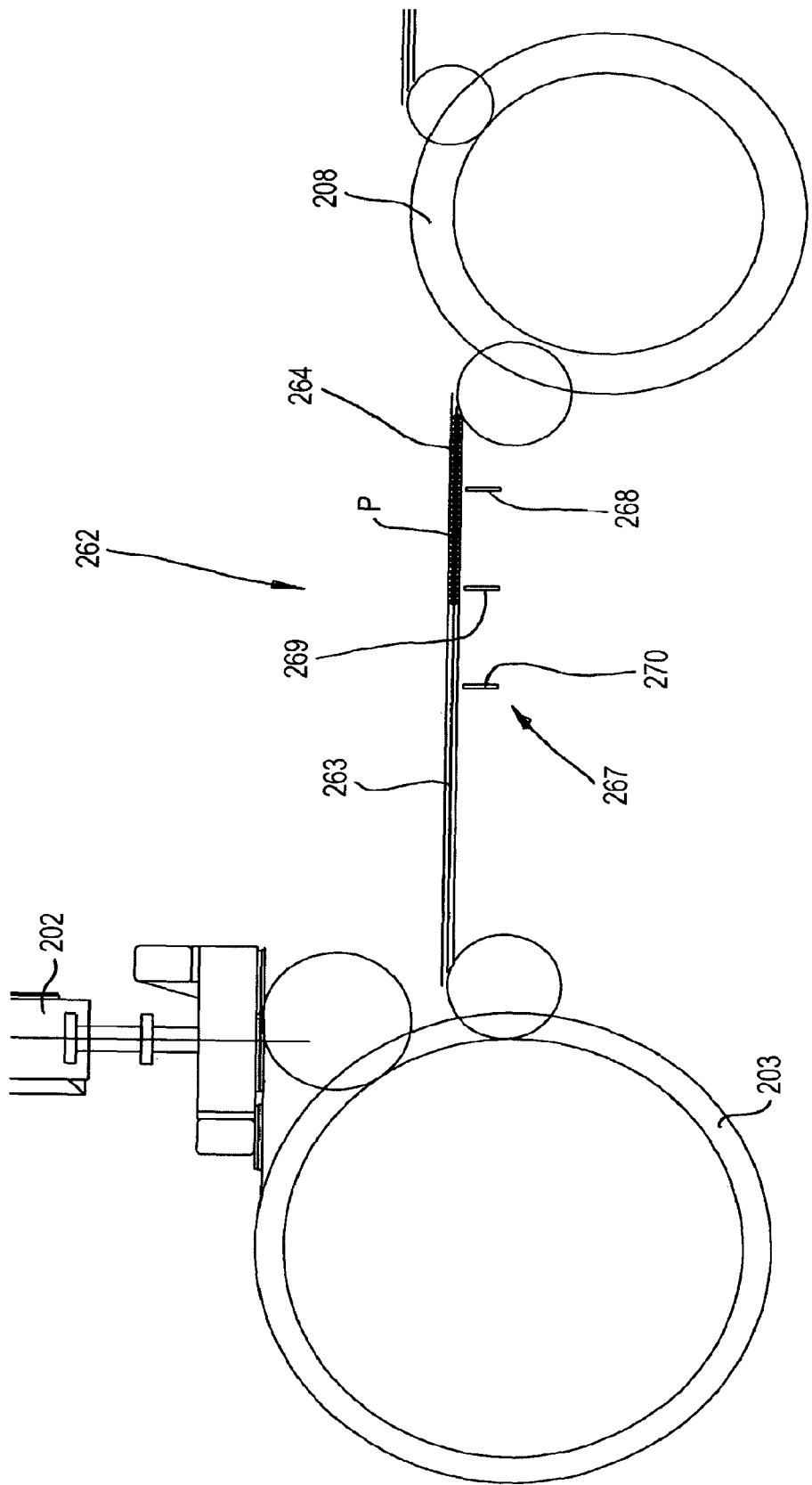
FIG. 21 is a detail of FIG. 20.
Figure 22:
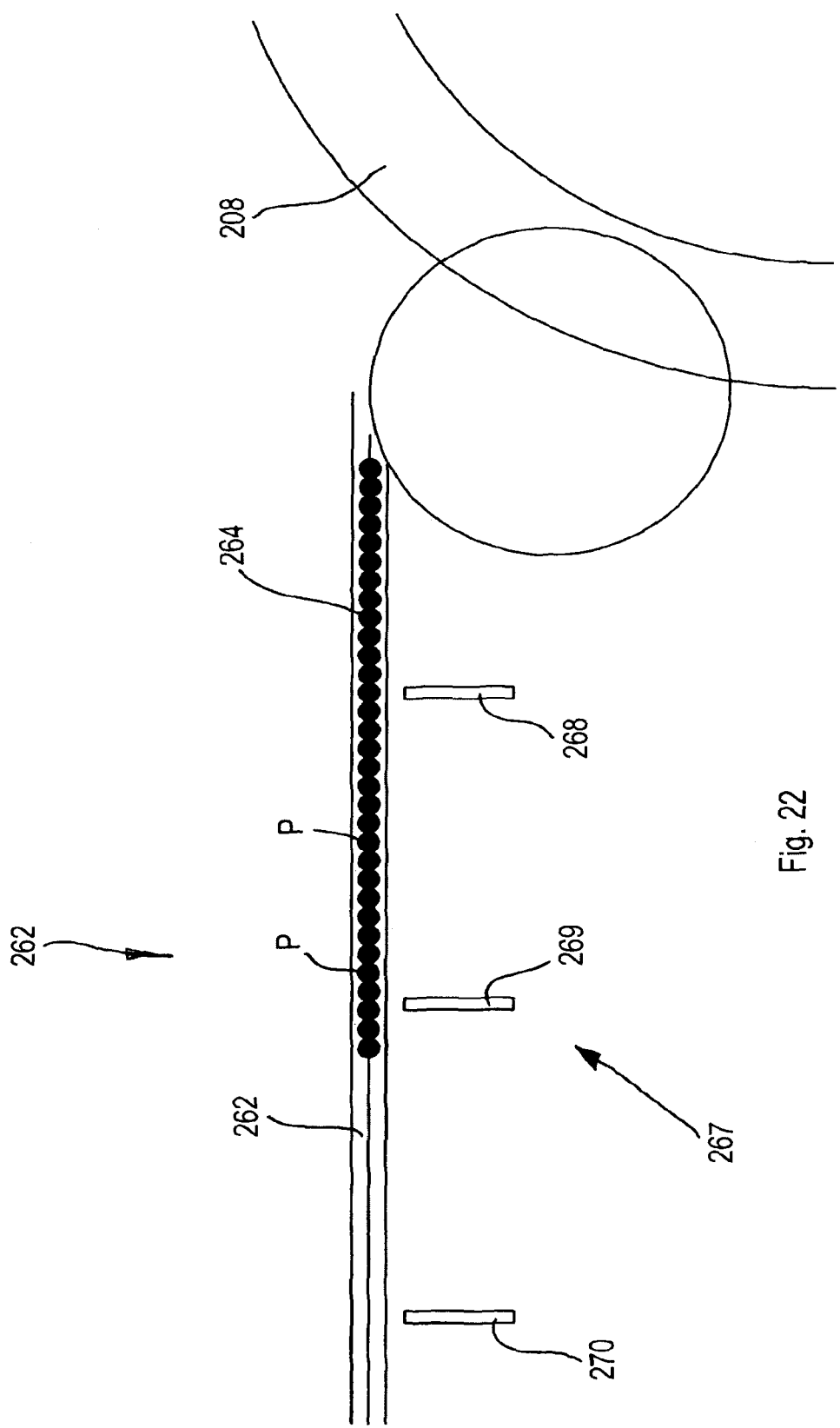
FIG. 22 is a detail of FIG. 21.

With reference to FIGS. 20 to 22 a version of the apparatus 201 is shown comprising a further accumulating arrangement 262, provided between the compression-moulding carousel 203 and the thermal conditioning carousel 208. The further accumulating arrangement 262 comprises a further channel 263 inside which the preforms P are supplied one after the other to form a further row 264.

The apparatus 201 further comprises a further sensor arrangement 267 arranged for detecting the quantity of preforms P found inside the further accumulating arrangement 262.

The further sensor arrangement 267 comprises a further first sensor 268, a further second sensor 269 and a further third sensor 270, the further first sensor 268 being nearer the thermal conditioning carousel 208, the further third sensor 270 being further away from the thermal conditioning carousel 208 and the further second sensor 269 being interposed between the further first sensor 268 and the further third sensor 270.

The command and control unit interacts with the further sensor arrangement 267 to manage the quantity of preforms in the further accumulating arrangement 262, with the methods disclosed with reference to FIGS. 18 and 19.

Similarly, an accumulating arrangement cooperating with a respective sensor arrangement can also be provided between the blow-moulding carousel 207 and the filling carousel and/or between the filling carousel and the capping carousel and/or between the capping carousel and the labelling carousel.

In these cases, the accumulating arrangement is conformed so as to receive containers, rather than preforms.

The accumulating arrangement and the sensor arrangement enable the apparatus 201 to operate with great flexibility.

Each of the components of the production line (carousels or devices of another type, for example tunnel conveyors), in fact, can be provided with a dedicated driving arrangement. Owing to the accumulating arrangement and to the sensor arrangement, the speed of each component can be varied to adapt to the speed of the component arranged upstream. Further, owing to the accumulating arrangement and to the sensor arrangement, a component can be maintained in operation, for a certain time, even if the component arranged upstream or downstream has been stopped.

Figure 23:
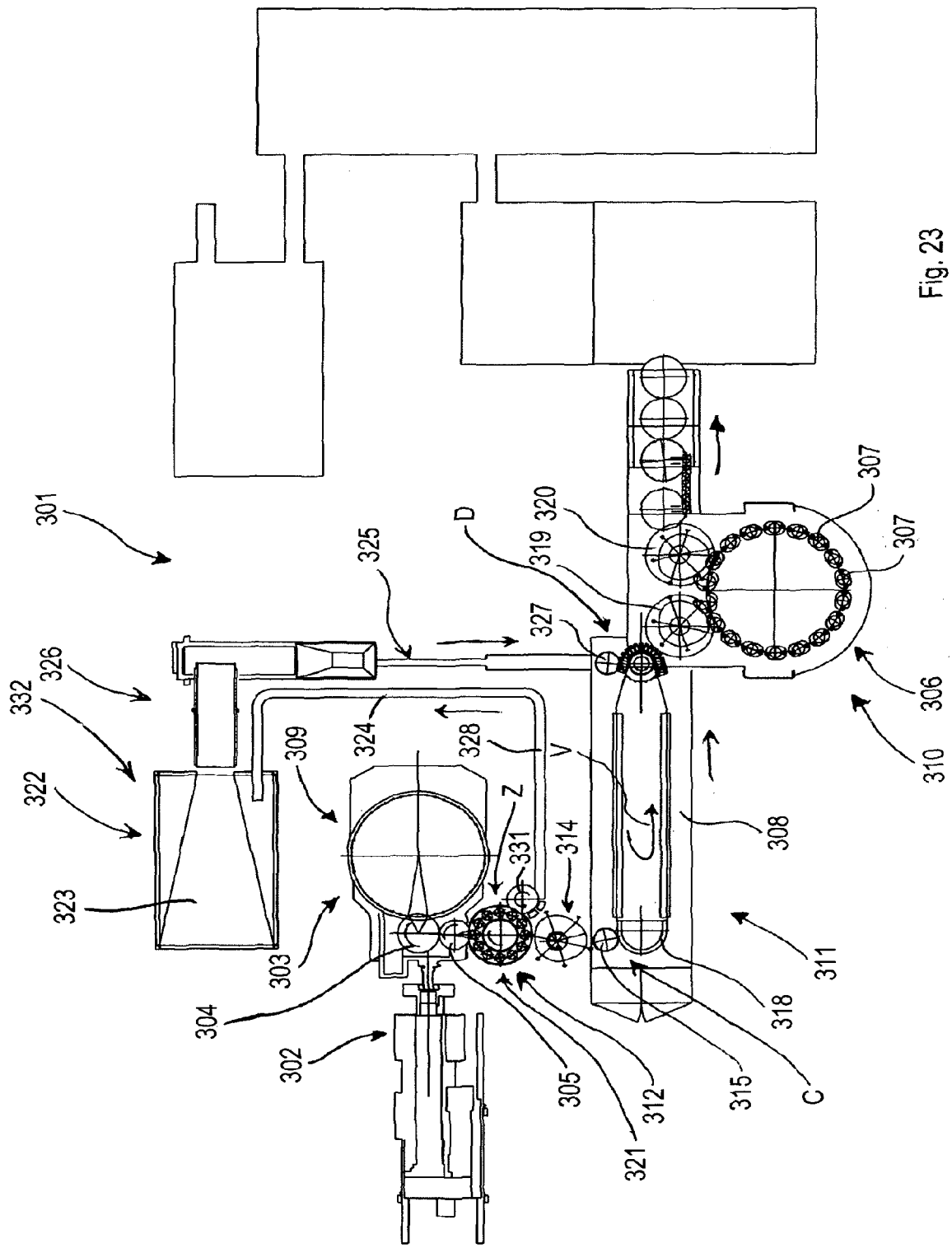
FIG. 23 is a schematic layout of another embodiment of an apparatus for producing containers.

With reference to FIG. 23, there is shown an apparatus 301 to produce preforms that are subsequently expanded to obtain containers intended for being filled with a product.

The apparatus 301 is provided with a plasticising device, for example an extruder 302, suitable for dispensing plastics in a pasty state. With the extruder 302 there can be associated a cutting device, which is not shown, that divides the plastics into doses.

The apparatus 301 is provided with a compression-moulding machine, in particular a compression-moulding carousel 303, positioned in a first operating zone 309. The compression-moulding carousel 303 is provided with a plurality of compression-moulding moulds—for example positioned at constant angular intervals on a peripheral zone of the compression-moulding carousel 303—that compression-mould the doses to obtain preforms Z.

Each compression-moulding mould comprises a female half mould and a male half mould, that are movable towards and away from one another, the female half mould being provided with a cavity arranged for receiving a dose and the male half mould being provided with a punch arranged for penetrating inside the cavity to shape the dose.

The apparatus 301 further comprises a first transfer carousel 304, interposed between the extruder 302 and the compression-moulding carousel 303. The first transfer carousel 304 removes the doses from the extruder 302 and inserts the doses into the compression-moulding moulds.

The first transfer carousel 304, further removes the preforms Z obtained from the compression-moulding moulds and delivers the preforms Z to a second transfer carousel 305.

The apparatus 301 further comprises a blow-moulding machine, in particular a blow-moulding carousel 306, positioned in a second operating zone 310. The blow-moulding carousel 306 is provided with a plurality of blow-moulding moulds 307—for example positioned at constant angular intervals on a peripheral zone of the blow-moulding carousel 306—that expand the preforms Z to obtain containers.

There is provided a thermal conditioning station 308 interposed between the compression-moulding carousel 303 and the blow-moulding carousel 306 and configured for thermally conditioning the preforms Z so as to prepare the preforms Z for blowing. The thermal conditioning station 308 is positioned in a third operating zone 311 interposed between the first operating zone 309 and the second operating zone 310.

The thermal conditioning station 308 comprises a thermal conditioning tunnel. A conveyor 318 is provided that advances the preforms Z along the tunnel of the thermal conditioning station. The conveyor 318 moves along a trajectory, for example of the closed-loop type, in an advancing direction V.

In an alternative embodiment, the conditioning station may comprise one or more thermal conditioning carousels and/or one or more thermal conditioning tunnels.

Upstream of the thermal conditioning station 308, in a loading zone C, a transferring wheel 315 is provided that rotates in an opposite direction to the advancing direction V of the conveyor 318. Upstream of the transferring wheel 315 a third transfer carousel 314 is provided. The third transfer carousel 314 receives the preforms Z that were obtained in the compression-moulding carousel 303 to give the preforms Z to the transferring wheel 315 that, in turn, supplies the preforms Z to the conditioning station 308, so that the preforms Z can be thermally conditioned.

The apparatus 301 comprises a moving arrangement 312 for moving the preforms Z to an intermediate zone 321 between the compression-moulding carousel 303 and the thermal conditioning station 308.

Owing to the moving arrangement 312, it is possible to advance the preforms Z between the compression-moulding step and the conditioning step, along advance paths that can be selected in function of the type or geometry of the preform, i.e. in function of the time required by this type or geometry of preform to be subjected appropriately to the cooling step. In other words, it is not necessarily necessary to vary the operating speed of the compression-moulding carousel 303 and/or of the blow-moulding carousel 306 to adapt the latter to the speed at which the preforms Z are cooled, as the intermediate zone 321 acts as a temporary accumulation zone in which the preforms Z remain for a time of varying length, depending on the chosen advance path.

Owing to the invention, it is thus possible to maintain a high number of containers produced per unit of time, regardless of the type and/or geometry of preforms that are processed.

Figure 24:
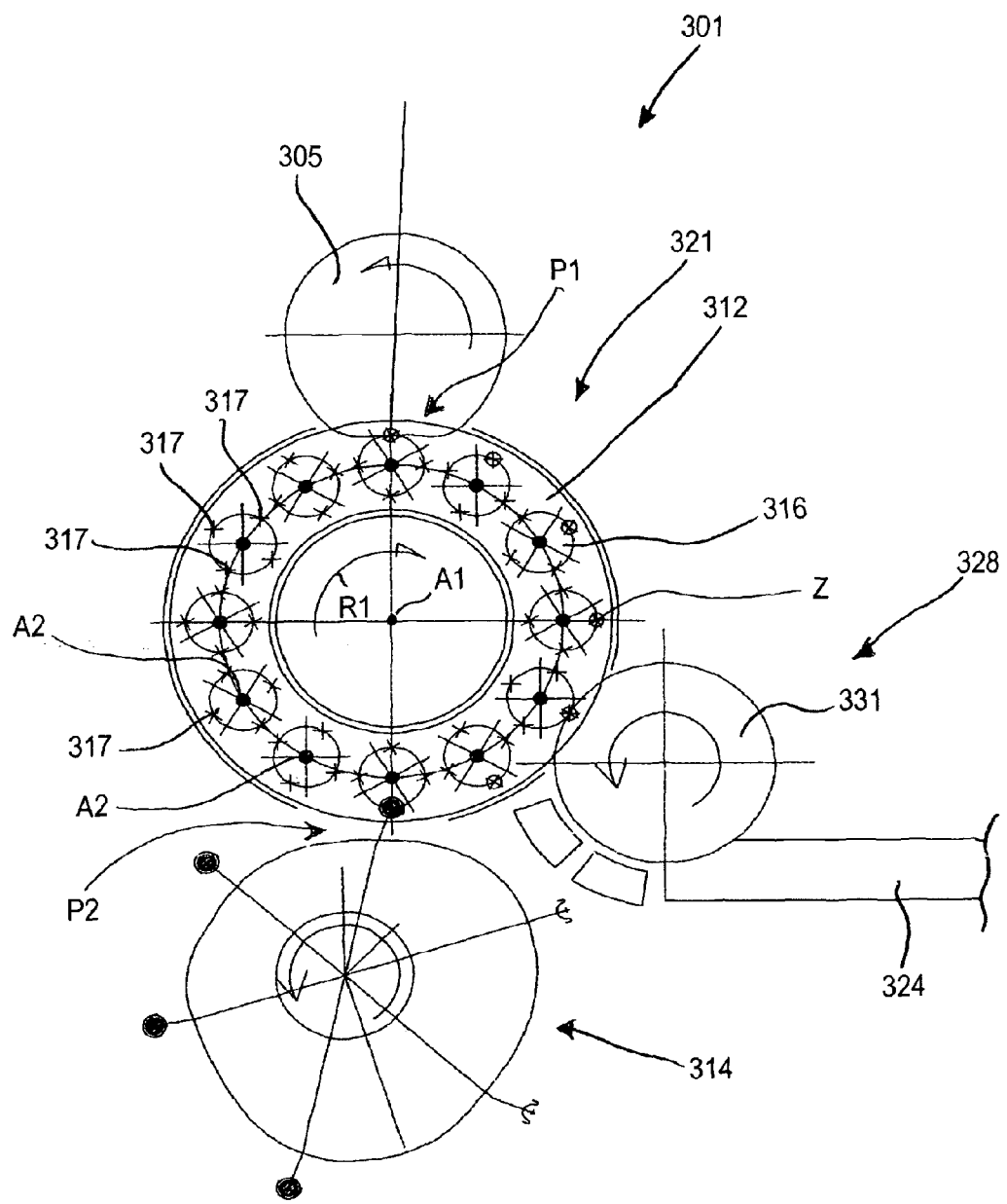
FIG. 24 shows a detail in FIG. 23 in a first operating configuration.
Figure 25:
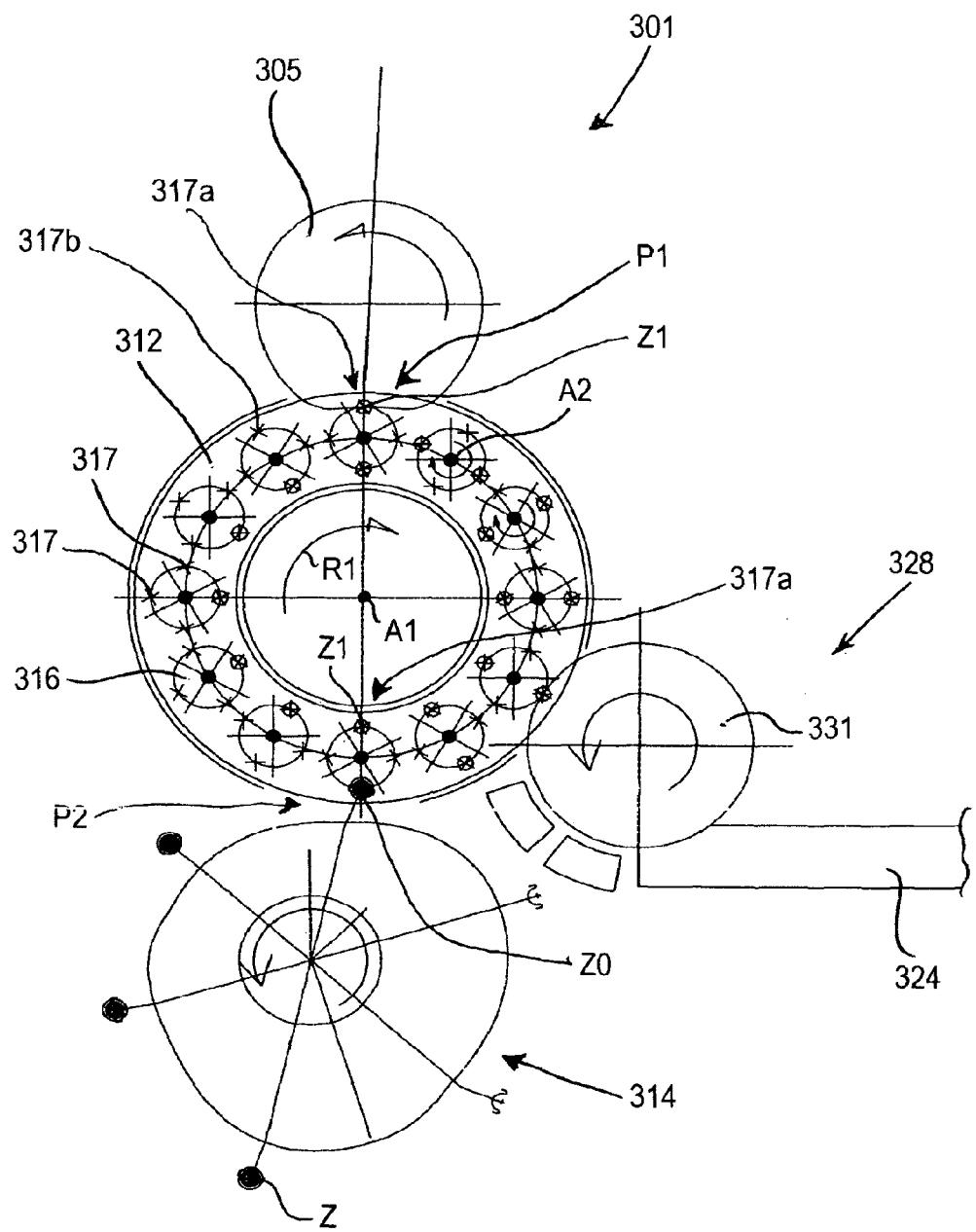
FIG. 25 shows the same detail in FIG. 24 in a second operating configuration.
Figure 26:
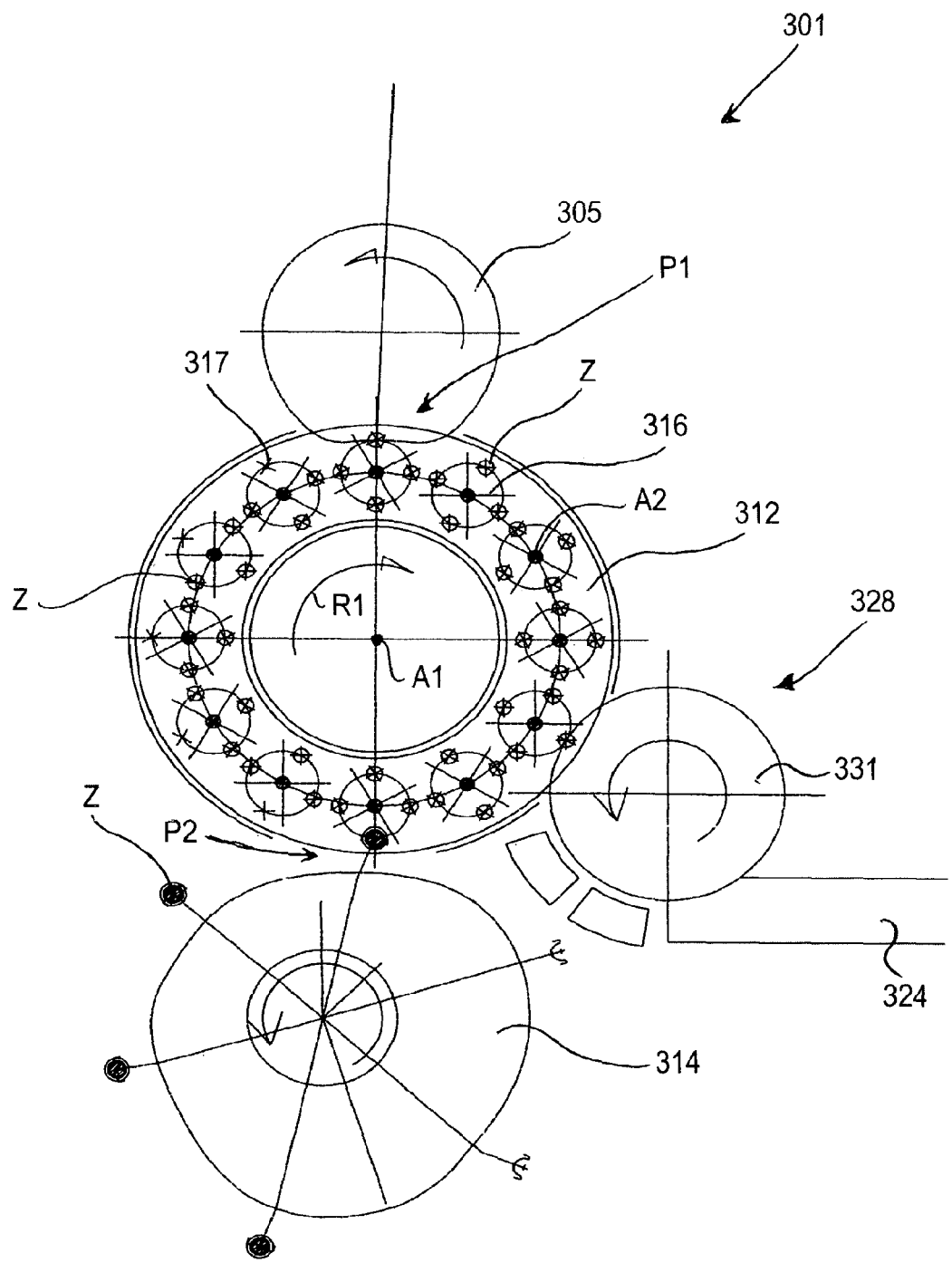
FIG. 26 shows the same detail in FIG. 24 in a third operating configuration.

The moving arrangement, in the embodiment shown in FIG. 23 and, in greater detail, in FIGS. 24 to 26, comprises a moving carousel 312 that is rotatable around a first rotation axis R1 in a first rotation direction R1. The moving carousel 312 is placed downstream of the second transfer carousel 305, and upstream of the third transfer carousel 314. The second transfer carousel 305 and the third transfer carousel 314 each rotate around a respective rotation axis parallel to the first rotation axis AI and in a rotation direction opposite the first rotation direction R1.

The moving carousel 312 is provided peripherally with a plurality of supporting carousels 316, that can be distributed angularly in a uniform manner. Each supporting carousel 316 can rotate around a respective second rotation axis A2.

In the disclosed example the moving carousel 312 is provided with twelve supporting carousels 316. In another embodiment it is possible to provide a different number of supporting carousels 316, depending on the required needs.

Each supporting carousel 316 comprises a plurality of seats 317, each of which is conformed to receiving a respective preform Z. In the example shown in FIGS. 24 to 26 each supporting carousel 316 is provided with four seats 317 angularly distributed in an equidistant manner from one another, but it is possible to provide a different number of seats 317.

Each supporting carousel 316 is mounted rotatably on the moving carousel 312. Each supporting carousel 316, by rotating with respect to the moving carousel 312, enables each of the seats 317 thereof to interact with the second transfer carousel 305 and/or with the third transfer carousel 314 respectively to receive and give a preform Z.

The supporting carousels 316, as also the moving carousel 312, and/or other rotatable components of the apparatus, can rotate continuously or by angular steps.

The moving carousel 312, and then the supporting carousels 316 thus configured, are able to retain the preforms Z for a considerable time, if this is necessary for given types or geometries of preform. In this manner it is not necessary to have to slow down operation and thus the productivity of the compression-moulding carousel 308 to enable the preforms Z to cool.

The moving carousel 312 and the supporting carousels 316 act as an accumulating arrangement for the preforms Z. In other words, it is possible to drive each supporting carousel 316 so as to receive one or more preforms Z each in a respective seat 317 depending on whether a lesser or greater period of time is required for the cooling step. In this manner, the preforms Z are advanced by the supporting carousels 316 along advance paths having a desired length and chosen selectively so as to vary the dwelling time on the moving carousel 312.

The apparatus 301 that is thus configured defines a production line having high productivity in relation to reduced overall dimensions. Each of the components of the apparatus 301 can be provided with a dedicated driving arrangement. Owing to the moving carousel 312 which acts as an accumulating device, the speed of each component can, in a certain manner, can be made independent of the speed of the component arranged upstream. It is further possible to maintain a component in function, for a certain time, even if the component arranged upstream, or downstream, has been stopped.

The supporting carousels 316 can be rotated with respect to the respective second rotation axes A2 such as to make thermal conditioning possible, in particular a cooling step, only in certain and defined angular positions, or it is possible to provide a cooling step that is active for all the time in which the supporting carousels 316 rotate. This can improve the thermal uniformity of the preforms and, particularly on each of the parts thereof, for example if there are thicknesses of the preforms Z that are variable from one zone to another zone.

The supporting carousels 316 can be driven, i.e. rotated continuously or be rotated by successive angular steps independently from one another.

The moving carousel 312 can be provided with a cooling system which enables the preforms Z to be cooled appropriately that are supported by the moving carousel 312. The cooling system may comprise a plurality of cooling devices, each of which is associated with a respective supporting carousel 316. In an embodiment it is possible to provide a cooling device for each of the seats 317 of each supporting carousel 316.

The cooling device may provide suitable chambers inside which the preforms Z are received, the chambers being able to be closed above and below. The cooling device can be configured to send a cooling fluid both to internal surfaces of the preforms and to external surfaces of the preform. In one embodiment, it is possible to provide closing devices that bound, on each supporting carousel 316, sector zones, in each of which a respective preform is received. The closing devices may comprise dividing-wall elements distributed in an equidistant manner by the respective preforms.

It is possible to configure the cooling system so as to act in a different manner according to the position that the preforms Z adopt whilst they are dragged by the moving carousel 312. Cooling can, for example, be by flows of air and/or gas that are introduced into the aforesaid cooling chambers. The flows of air and/or gas can be directed to the preform in a coaxial manner or according to directions chosen in order to localise cooling in determined zones. It is possible, for example, to act to cool the external and the internal surfaces of the preforms Z in a different manner, depending on the different temperature values that obtain in various zones of the preform. For example the cooling device can take into account the fact that the temperature of the external surfaces of the preforms Z, at the end of compression-moulding, is less than the temperature of the internal surfaces.

Below, some operating methods of the moving carousel 312 and of the supporting carousels 316 are disclosed in greater detail below to explain the operation thereof better.

In FIG. 24 there is shown a first operating mode of the moving carousel 312 and of the supporting carousels 316. In the first operating mode each supporting carousel 316 is not rotated with respect to the moving carousel 312, but is dragged only by the latter, which in turn rotates around the first rotation axis AI. In other words, the supporting carousels 316 do not rotate around the respective second rotation axes A2. In this manner, only one side 317 of each supporting carousel 316 is used, in particular the seat 317 positioned nearer the peripheral zone of the moving carousel 312. Each preform Z is thus transferred from the second transfer carousel 305 to a seat 317 in a first position P1, and is conducted via rotation of the moving carousel 312 to a second position P2, in which each preform is given to the third transfer carousel 314. In this manner, each preform moves along a first path that corresponds to a substantially semicircular trajectory.

A very reduced dwelling time of the preforms Z on the moving carousel corresponds to this first path. This is useful when the geometry and/or the type of preforms Z are such as to permit very rapid cooling steps.

FIG. 25 shows a second operating mode in which the dwelling time of the preforms on the moving carousel 312 is increased with respect to the first operating mode that has just been described. Of each supporting carousel 316 only two of the four available seats 317 are used. In particular, two seats 317 are used that are diametrically opposite one another.

For each supporting carousel 316 that is located in the first position P1, a first preform Z1 is received in a first seat 17a arranged more peripherally with respect to the moving carousel 312 and nearer the second transfer carousel 305. Once the first preform Z1 is received, the supporting carousel 316, which in the meantime is rotatingly dragged by the moving carousel 312, rotates around the own second rotation axis A2 by approximately 180°. In this manner, the first seat 317 containing the first preform Z1 that has just been received is moved to a position diametrically opposite the previously occupied position (with respect to the second rotation axis A2). In other words, the first preform Z1 is moved from a more peripheral position to a central zone of the moving carousel 312. When the supporting carousel 316 is conducted to the position P2, in the meantime a preform Z0 already previously received by the moving carousel 312 with respect to the first preform Z1, and which is thus suitably cooled, is given to the third transfer carousel 314.

In the meantime, the moving carousel 312 continues to rotate and takes the supporting carousel 316 under examination again to the second transfer carousel 305 in the first position P1, in such a manner that a second seat 17b, diametrically opposite the first seat 317 can receive a second preform. At this point, the supporting carousel 316 is rotated around the own second rotation axis A2 by a further angle equal to approximately 180° in such a way as to return the first seat 317 to a more peripheral position on the moving carousel 312. In this manner, the first seat 317 can interact, in the second position P2, with the third transfer carousel 314, giving to the latter the first preform. At this point, the moving carousel 312 continues to rotate and the first seat 317, which is now free, is again moved to the second transfer carousel 305 to receive the third preform. Subsequently, the supporting carousel 316 is rotated by a still further angle of 180° so as to give also the second preform to the third transfer carousel 314 in the second position P2 and so on.

What has just been described applies to each of the supporting carousels 316. In substance, in this operating mode, each preform is retained on the moving carousel 312 in such a way as to define a second path corresponding substantially to one and a half revolutions of the moving carousel 312. In such a manner a dwelling time is used that is three times the dwelling time associated with the first operating mode disclosed above, i.e. if the second transfer carousel 305 and the third transfer carousel 314 are located in positions that are diametrically opposed to one another with respect to the moving carousel 312.

FIG. 26 shows a third operating mode that enables all four seats 317 of each supporting carousel 316 to be exploited. In this operating mode, the dwelling time of the preforms Z on the moving carousel 312 is at maximum with respect to the previously disclosed cases. Each supporting carousel 316, whilst it is conveyed by the moving carousel 312 from the first position P1 to the second position P2, rotates around the respective second axis A2 by a quarter revolution so as to give a now cooled preform Z to the third transfer carousel 314. The seat that is freed receives a further preform Z from the second transfer carousel 305 and so on. In this case—in which there are four seats 317 for each supporting carousel 316—each supporting carousel 316 rotates around the second rotation axis A2 by successive angles equal to approximately 90° in such a manner that each seat 317, in a sequential manner receives a preform Z and subsequently gives the preform Z after a set number of revolutions of the moving carousel 312. In this case each preform Z moves along a path having a length corresponding to three and a half revolutions of the moving carousel 312.

The dwelling time in this operating mode is seven times that of the first operating mode disclosed above.

Obviously, and in an operating mode that is similar to what has been seen so far, one operating mode is provided that is not shown in which three of the four seats 317 of each supporting carousel 316 are used.

A similar operation moving carousel 312 to what is disclosed above is provided if there is a different number of supporting carousels 317 and/or a different number of seats 317 on each supporting carousel 316.

In the various embodiments of the apparatus 301 disclosed above, it is possible to provide on the moving carousel 312 a heating device that acts on the preforms Z, after the cooling step, so as to perform a slight heating step on the latter. The heating device can act selectively on certain critical parts of each preform Z that need to be prepared for the subsequent and more thorough step of thermal conditioning that occurs in the thermal conditioning station 308. In this manner it is possible to eliminate or substantially reduce possible thermal imbalances in the preforms Z.

The heating device can act at set angular positions of each supporting carousel 316 and/or of the moving carousel 312.

The preforms Z, after remaining on the moving carousel 312 for the time necessary for cooling, are given to the third transfer carousel 314, which in turn delivers the preforms Z to the transferring wheel 315. The transferring wheel 315, lastly, transfers the preforms Z to the conditioning station 308 where the preforms Z can receive suitable thermal treatment that has the purpose of preparing the preforms Z for successive blow-moulding on the blow-moulding carousel 306.

Downstream of the conditioning station 308 there is provided a fourth transfer carousel 319, suitable for transferring the preforms Z exiting the conditioning station 308 to the blow-moulding carousel 306. Downstream of the conditioning station 308 a fifth transfer carousel 320 is provided that is used to remove from the blow-moulding carousel 306 the containers obtained from the preforms Z and send the containers to possible operating stations located further downstream. Such operating stations may comprise, for example, a filling station for filling the containers with a product, for example a liquid material, a powder or granule material, a paste material and the like. The aforesaid product can be, for example, a food product or a cosmetic product. It is possible also to provide a closing or capping station to close the containers that are possibly filled and/or a labelling station for the containers.

With reference to FIG. 23, the apparatus 301 comprises a storage station 322, positioned in a storing zone (332) and provided, for example, with a hopper 323 suitable for containing preforms.

A bypass device 328 is provided that enables the preforms to be directed to the storage station 322. In this manner it is possible to conserve the compression-moulded preforms that do not have to be sent immediately to the blow-moulding carousel 306 but can be processed subsequently. The storage station 322 can also receive preforms that have been produced elsewhere, for example injection-moulded preforms.

The bypass device 328 comprises a bypass conveyor 324 that connects the moving carousel 312 to the hopper 323. The bypass conveyor 324 can be, for example, of the belt or chain type.

The bypass device 328 comprises a removing wheel 331 suitable for removing the preforms Z from the moving carousel 312 to position the preforms Z on the bypass conveyor 324.

Owing to the embodiment of the apparatus 301 in FIG. 23, it is possible to produce preforms Z and conserve the preforms Z for any period of time that is desired, postponing the blow-moulding of the preforms Z to a subsequent moment. In this operating mode, it may be necessary to perform more thorough cooling of the preforms Z on the moving carousel 312, to prevent the preforms Z possibly being damaged in the subsequent conveying and storage steps. For this purpose, it is possible to increase the dwelling time of the preforms Z on the moving carousel 312, operating the latter, for example in the second operating mode, disclosed with reference to FIG. 25, or in the third operating mode, disclosed with reference to FIG. 26. The operating mode of the moving carousel 312 can be varied by acting on a control unit and setting a change to the operating programme.

The preforms Z are cooled on the moving carousel 312 so as to have a temperature below a set value in order to avoid crystallisation thereof. In one embodiment, on the second transfer carousel 305 there can be provided an air and/or gas cooling arrangement configured for thermally conditioning the preforms Z in a preliminary manner, i.e. in such a manner as to anticipate the thermal conditioning that subsequently takes place on the moving carousel 312. Also in this case, the cooling arrangement can be configured for acting in a selective manner on given zones of the preforms Z, and/or at determined angular positions of the second transfer carousel 305.

The apparatus 301 can be provided with a discarding device that discards the preforms having certain defects that are detectable with suitable vision systems. The discarding device can be provided on the removing wheel 331 and/or on the third transfer carousel 314.

A supplying system 326 is further provided that is suitable for removing the preforms stored in the storage station 322 to insert preforms into the production line defined by apparatus 301.

The supplying system 326 comprises a supplying conveyor 325 suitable for conveying the preforms from the storage station 322 to the conditioning station 308.

Downstream of the supplying conveyor 325 there is provided a further transferring wheel 327, suitable for transferring the preforms coming from the storage station 322 to the conditioning station 308. In particular, the further transferring wheel 327 transfers the preforms from the supplying conveyor 325 to the conveyor 318 of the conditioning station 308 in a further loading zone D, opposite the loading zone C, with respect to the conveyor 318. The further transferring wheel 327 is connected so as to be upstream of the transferring wheel 315 with respect to the advancing direction V of the conveyor 318. In this manner, the preforms that arrive from the storage station 322 and that may thus require a more thorough thermal conditioning step with respect to the preforms coming from the compression-moulding carousel 303, can travel, via the conveyor 318, along a trajectory of greater length inside the conditioning tunnel.

The supplying system 326 and/or the supplying conveyor 325 is configured for suitably orientating the preforms removed from the storage station 322.

Figure 27:
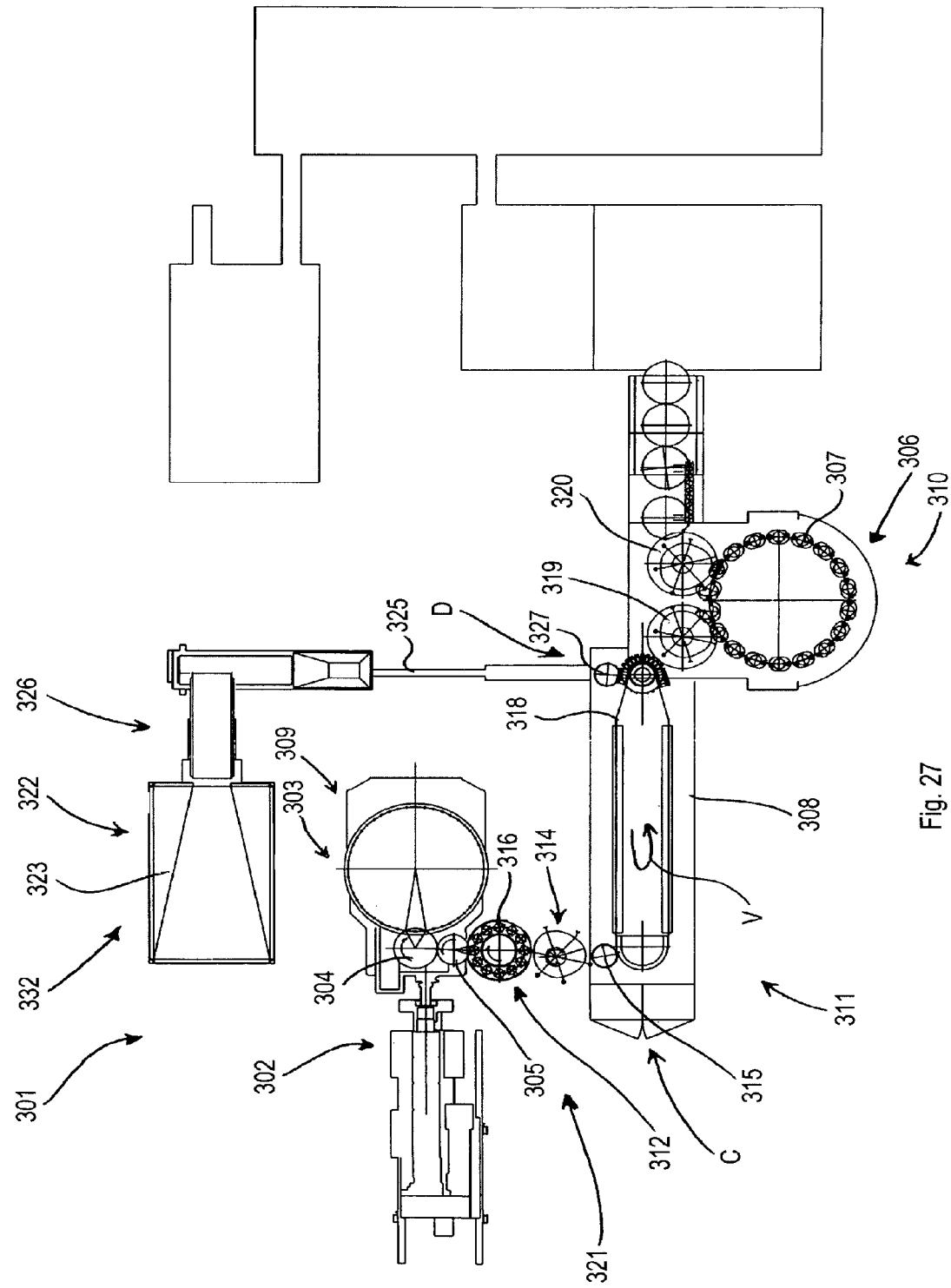
FIG. 27 is a schematic layout of a further embodiment of the apparatus for producing containers.

FIG. 27 shows another apparatus embodiment 301 that differs from the embodiment disclosed with reference to FIG. 23 inasmuch as the bypass device 328 is not provided. In this case, the apparatus 301 can process preforms that have just been obtained in the compression-moulding carousel 303 or preforms that are removed from the storage station 322 and were previously obtained. The preforms coming from the storage station 322 can be of a different nature, for example they can be produced by injection moulding in a production plant that is distinct from the apparatus 301.

With reference to FIG. 28, there is shown a still further embodiment of the apparatus 301 that is different from the preceding embodiments inasmuch as neither the bypass device 328 nor the storage station 322 and thus the supplying system 326 are provided.

In this embodiment, the apparatus 301 comprises a conditioning station 329 similar to that disclosed in the apparatus embodiments 301 shown in FIGS. 23 and 27 but provided with a conditioning tunnel of reduced length. A further conveyor 330 is provided that advances in a further advancing direction V'. In this case, the transferring wheel 315 is positioned at an end of the tunnel that is nearer the fourth transfer carousel 319.

The preforms that are dropped from the transferring wheel 315 to the further conveyor 330 run along the tunnel first in one direction, away from the fourth transfer carousel 319, and then in the opposite direction, towards the fourth transfer carousel 319. Owing to this configuration, it is possible to thermally conditioning the preforms in an effective manner and simultaneously the overall dimensions associated with the conditioning station 308 are reduced significantly.

Variations and/or additions to what has been disclosed and illustrated in the enclosed drawings are possible.

In particular, any moving arrangement can be used that defines advance paths of variable lengths so as to be able to obtain variable dwelling times of the preforms between the compression-moulding and the thermal conditioning zones of the preforms.

The invention claimed is:

1. An apparatus for producing plastic containers, comprising:
    a forming machine for producing plastic preforms;
    a blow-moulding machine for blowing the preforms to obtain containers, provided with a blow-moulding carousel having a plurality of blow-moulding moulds that expand the preforms to obtain the containers;
    a thermal conditioning station interposed between the forming machine and the blow-moulding machine, wherein an advance path is defined for feeding the preforms from the forming machine to the blow-moulding machine, directly through the thermal conditioning station;
    a storage station, configured for receiving and containing preforms;
    a supplying system for feeding the thermal conditioning station with preforms contained in the storage station;
    a bypass device configured for removing the preforms from the advance path and transferring them to the storage station through a bypass conveyor;
    a thermal conditioning device for cooling the preforms removed from the advance path by the bypass device;

a supplying conveyor configured for conveying the preforms from the storage station directly into the advance path at the thermal conditioning station.

2. The apparatus according to claim 1, wherein the supplying system has a supplying conveyor for conveying the preforms from the storage station to the thermal conditioning station.

3. The apparatus according to claim 2, comprising, downstream of the supplying conveyor, a transferring wheel, for transferring the preforms coming from the storage station to the thermal conditioning station.

4. The apparatus according to claim 3, wherein the conditioning station comprises a thermal conditioning tunnel and a conveyor that advances the preforms along said tunnel,
and wherein upstream of the thermal conditioning station, in a loading zone, a transferring wheel is provided that rotates in a direction opposite to the advancing direction of the conveyor of the thermal conditioning station.

5. The apparatus according to claim 4, wherein said transferring wheel is configured for transferring the preforms from the supplying conveyor to the conveyor of the conditioning station in a further loading zone opposite said loading zone, with respect to the conveyor.

6. The apparatus according to claim 4, wherein said transferring wheel is connected so as to be upstream of the transferring wheel with respect to the advancing direction of the conveyor of the conditioning station.

7. The apparatus according to claim 1, wherein the supplying system is configured for orientating the preforms removed from the storage station to be fed to the thermal conditioning station.

8. The apparatus according to claim 1, comprising a bypass device configured to direct to the storage station the preforms generated in the forming machine.

9. The apparatus according to claim 1, comprising:
a bypass device configured to direct to the storage station the preforms generated in the forming machine;
a filling carousel connected downstream to the blow-moulding machine, for filling the blown containers with a product;
a further bypass device configured for supplying the filling carousel from the a storage station with containers manufactured in the blow-moulding machine at an earlier stage and subsequently stored.

10. The apparatus according to claim 1, comprising a control arrangement configured for detecting a parameter indicating the quantity of the preforms contained in the storage station, wherein the storage station constitutes an accumulating arrangement.

11. The apparatus according to claim 10, wherein said control arrangement is configured for regulating the operation of said blow-moulding machine on the basis of said parameter.

12. The apparatus according to claim 1, wherein the forming machine, the blow-moulding machine and the thermal conditioning station define a production line, and wherein the supplying system is configured for removing the preforms stored in the storage station to insert said preforms into said production line.

13. The apparatus according to claim 1, wherein the storage station defines an accumulating arrangement for receiving and containing preforms, and wherein the accumulating arrangement is provided with a cooling system for cooling the preforms.

14. The apparatus according to claim 1, wherein the storage station defines an accumulating arrangement for receiving and containing preforms, and wherein the accumulating arrangement is provided with heating device for heating the preforms.

15. A method for producing plastic containers, comprising the following steps:
producing plastic preforms through a forming machine;
conditioning the preforms in a thermal conditioning station;
blow-moulding the preforms to obtain containers;
transferring the preforms from the forming machine to the blow-moulding machine, directly through the thermal conditioning station, along an advance path;
storing the preforms in a storage station;
removing the preforms from the advance path and transferring them to the storage station through a bypass conveyor;
cooling the preforms removed from the advance path to be transferred to the storage station;
feeding the preforms stored in the storage station to the conditioning station through a supplying system, whereby, after the step of producing the preforms, it is possible to conserve the preforms for any period of time that is desired, postponing the blow-moulding of the preforms to a subsequent moment, wherein the preforms are fed from the storage station to the advance path at the thermal conditioning station through a supply conveyor.

16. The method according to claim 15, comprising a step of directing the preforms produced in the forming machine to the storage station through a bypass device.

17. The method according to claim 15, comprising a step of feeding the storage station with preforms that have been produced in a further forming machine, with respect to said forming machine, wherein the preforms are produced by compression moulding and/or by injection-moulding.

18. The method according to claim 15, wherein the step of supplying said preforms from the storage station to the conditioning station comprises a step of orientating the preforms removed from the storage station.

19. The method according to claim 15, comprising a step of cooling the preforms moved towards the storage station for accumulation, and/or heating the preforms moved away from the storage station.

20. The method according to claim 15, comprising a step of detecting a parameter indicating the quantity of the preforms accumulated in the storage station.

* * * * *